US012021452B2

United States Patent
Ye et al.

(10) Patent No.: US 12,021,452 B2
(45) Date of Patent: Jun. 25, 2024

(54) MULTI-RESONANT SWITCHED CAPACITOR POWER CONVERTER ARCHITECTURE

(71) Applicant: THE REGENTS OF THE UNIVERSITY OF CALIFORNIA, Oakland, CA (US)

(72) Inventors: Zichao Ye, El Cerrito, CA (US); Robert Pilawa-Podgurski, Alameda, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 18/320,879

(22) Filed: May 19, 2023

(65) Prior Publication Data

US 2024/0128864 A1    Apr. 18, 2024

Related U.S. Application Data

(63) Continuation of application No. PCT/US2021/060391, filed on Nov. 22, 2021.

(Continued)

(51) Int. Cl.
*H02M 3/07* (2006.01)
*H02M 1/00* (2006.01)
*H02M 3/158* (2006.01)

(52) U.S. Cl.
CPC ........... *H02M 3/07* (2013.01); *H02M 1/0043* (2021.05); *H02M 1/0058* (2021.05); *H02M 1/0095* (2021.05); *H02M 3/158* (2013.01)

(58) Field of Classification Search
CPC .... H02M 3/07; H02M 1/0043; H02M 1/0058; H02M 1/0095; H02M 3/158
See application file for complete search history.

(56) References Cited

U.S. PATENT DOCUMENTS

2009/0278520 A1* 11/2009 Perreault ................. H02M 3/07
                                                                  323/282
2014/0043010 A1    2/2014  Salem
(Continued)

FOREIGN PATENT DOCUMENTS

WO    2022109416 A1    5/2022

OTHER PUBLICATIONS

ISA/US, United States Patent and Trademark Office (USPTO), International Search Report and Written Opinion issued Feb. 4, 2022, related PCT international application No. PCT/US2021/060391, pp. 1-16, claims searched, pp. 17-21.

*Primary Examiner* — Rafael O De Leon Domenech
(74) *Attorney, Agent, or Firm* — O'BANION & RITCHEY LLP; John P. O'Banion

(57) ABSTRACT

A switched-capacitor (SC) network in an SC converter is controlled to operate at varying resonant modes to achieve high conversion ratio efficiency, at a low circuit component count. These power converters are suited to numerous application areas including improving energy efficiency of data centers. A family of resonant switched capacitor (SC) converters with multiple operating phases are presented "Multi-Resonant SC Converters". Described in detail are an 8-to-1 Multi-Resonant-Doubler (MRD) converter and a 6-to-1 Cascaded Series-Parallel (CaSP). The topology of these converters make them amenable to combining like units in parallel toward reaching higher power levels.

17 Claims, 14 Drawing Sheets

Related U.S. Application Data

(60) Provisional application No. 63/117,142, filed on Nov. 23, 2020.

(56) References Cited

U.S. PATENT DOCUMENTS

| | | | |
|---|---|---|---|
| 2018/0019667 A1* | 1/2018 | Salem | H02M 3/07 |
| 2018/0205315 A1 | 7/2018 | Giuliano | |
| 2019/0089258 A1 | 3/2019 | Giuliano | |
| 2019/0115830 A1* | 4/2019 | Giuliano | H02M 3/158 |
| 2019/0273433 A1 | 9/2019 | Salem | |
| 2019/0305598 A1* | 10/2019 | Chen | H02J 50/12 |
| 2019/0356149 A1* | 11/2019 | Li | H02M 3/1582 |
| 2020/0186039 A1 | 6/2020 | Cheng | |
| 2020/0366120 A1* | 11/2020 | Yuan | H02J 50/12 |

\* cited by examiner

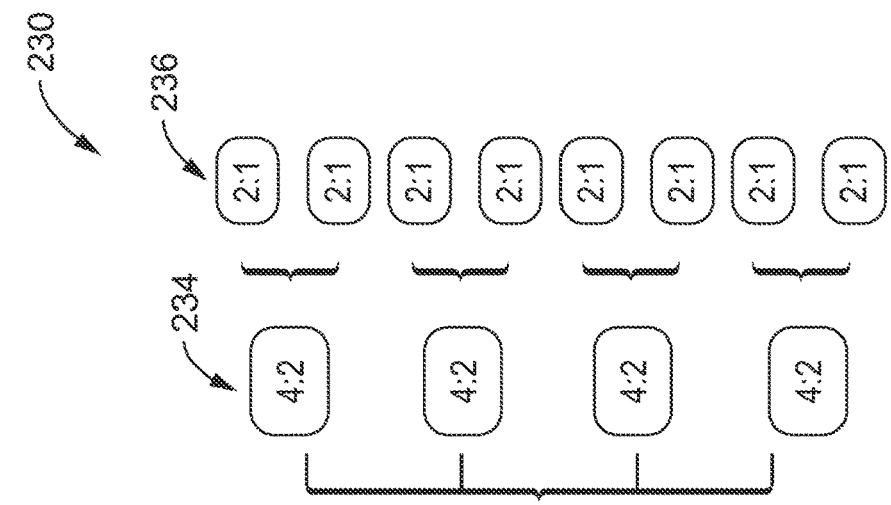
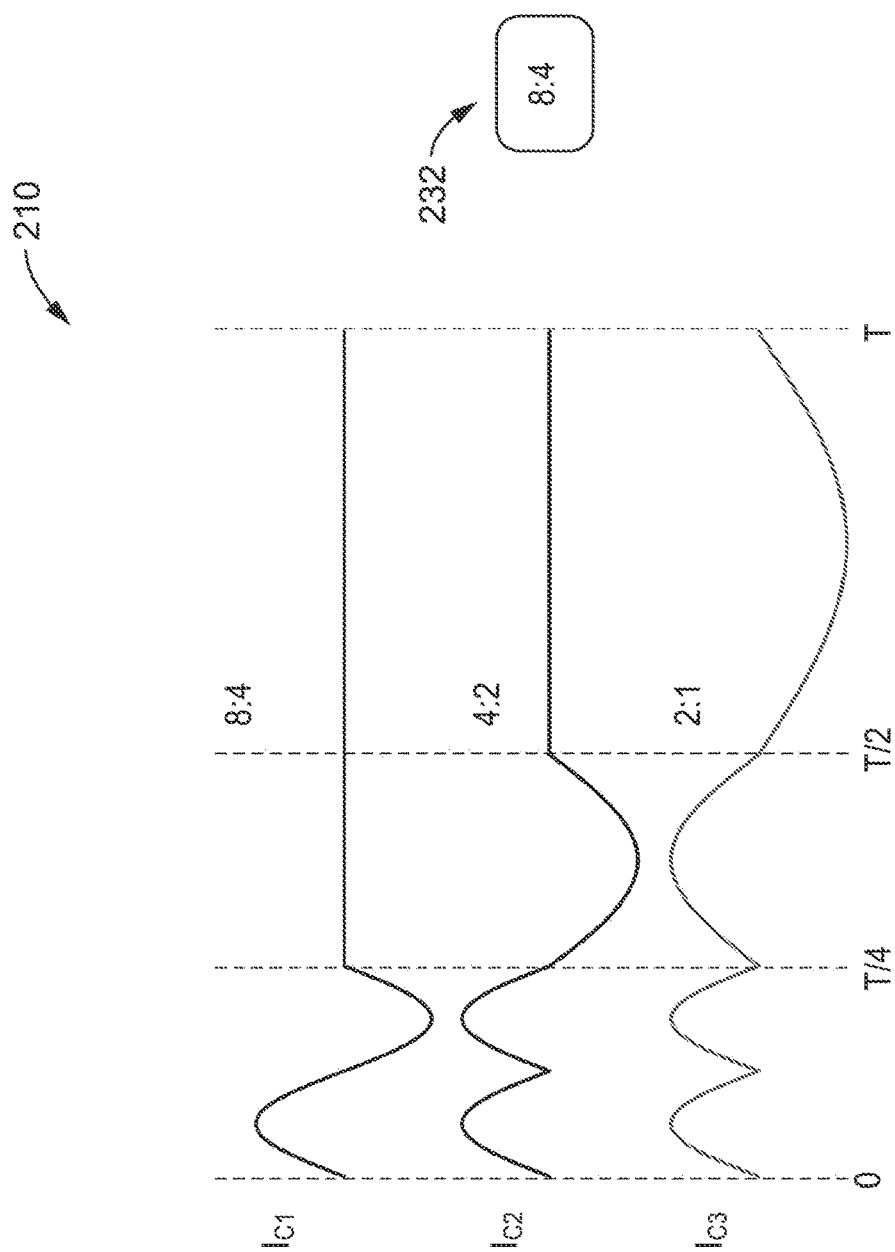
FIG. 5B
FIG. 5A

MULTI-RESONANT SWITCHED CAPACITOR POWER CONVERTER ARCHITECTURE

CROSS-REFERENCE TO RELATED APPLICATIONS

This application claims priority to, and is a 35 U.S.C. § 111(a) continuation of, PCT international application number PCT/US2021/060391 filed on Nov. 22, 2021, incorporated herein by reference in its entirety, which claims priority to, and the benefit of, U.S. provisional patent application Ser. No. 63/117,142 filed on Nov. 23, 2020, incorporated herein by reference in its entirety. Priority is claimed to each of the foregoing applications.

The above-referenced PCT international application was published as PCT International Publication No. WO 2022/109416 A1 on May 27, 2022, which publication is incorporated herein by reference in its entirety.

STATEMENT REGARDING FEDERALLY SPONSORED RESEARCH OR DEVELOPMENT

This invention was made with Government support under Contract No. DE-AR0000906, awarded by the DOE Advanced Research Projects Agency-Energy. The Government has certain rights in the invention.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to power converters, and more particularly to a multi-resonant switched capacitor power converter architecture.

2. Background Discussion

Traditional power converters use either inductor(s) or capacitor(s) as the intermediate energy storage element. However, these both have limitations that affect the achievable power conversion efficiency and power density. Hybrid-type converters called hybrid switched-capacitor (SC) converters use both capacitors and inductors in the voltage conversion and power transfer process.

However, the power converter architecture in this class of converters are generally limited to low conversion ratios, such as 4-to-1 ratios, and thus are not well suited for numerous important applications.

Accordingly, the present disclosure overcomes the conversion ratio shortcomings of these prior converters, while providing additional benefits.

BRIEF SUMMARY

Advanced power converter topology and control techniques are described which can significantly improve efficiency and power density of non-isolated dc-dc power conversion. Specifically, a switched-capacitor network is controlled to operate at varying resonant modes to achieve high conversion ratio efficiency, while requiring very low circuit component counts. Power converters based on this novel architecture can be adopted to improve the energy efficiency of the fast growing number of data centers.

A family of resonant switched capacitor (SC) converters with multiple operating phases is thus presented which are referred to herein as "Multi-Resonant SC Converters". These converters can be synthesized from the basic two-phase SC topologies, such as the doubler and the series-parallel, and are capable of achieving the same conversion ratio with fewer capacitors and switches. The augmented inductor can resonantly charge/discharge all flying capacitors at different resonances, thereby facilitating soft-charging and soft-switching operation. Exemplifying these concepts, embodiments are described for an 8-to-1 Multi-Resonant-Doubler (MRD) converter and a 6-to-1 Cascaded Series-Parallel (CaSP) converter, as well as other examples.

The present disclosure is well suited in numerous applications, which by way of example and not limitation include: data center power delivery for supporting the ever-increasing power demands of machine learning and Internet-of-Things (IoT), all-electric and hybrid vehicles in bridging 400V battery bus voltage and 48V subsystems, portable electronics by increasing efficiency and providing faster wired/wireless charging, solar photovoltaic systems with improved conversion efficiencies between the solar panel and the grid, as well as numerous additional areas.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 5A and FIG. 5B are waveforms and a hierarchy diagram illustrating the ability to use the disclosed converters in parallel operations for achieving higher output power, according to at least one embodiment of the present disclosure.

DETAILED DESCRIPTION

1. Introduction

Figure 1:
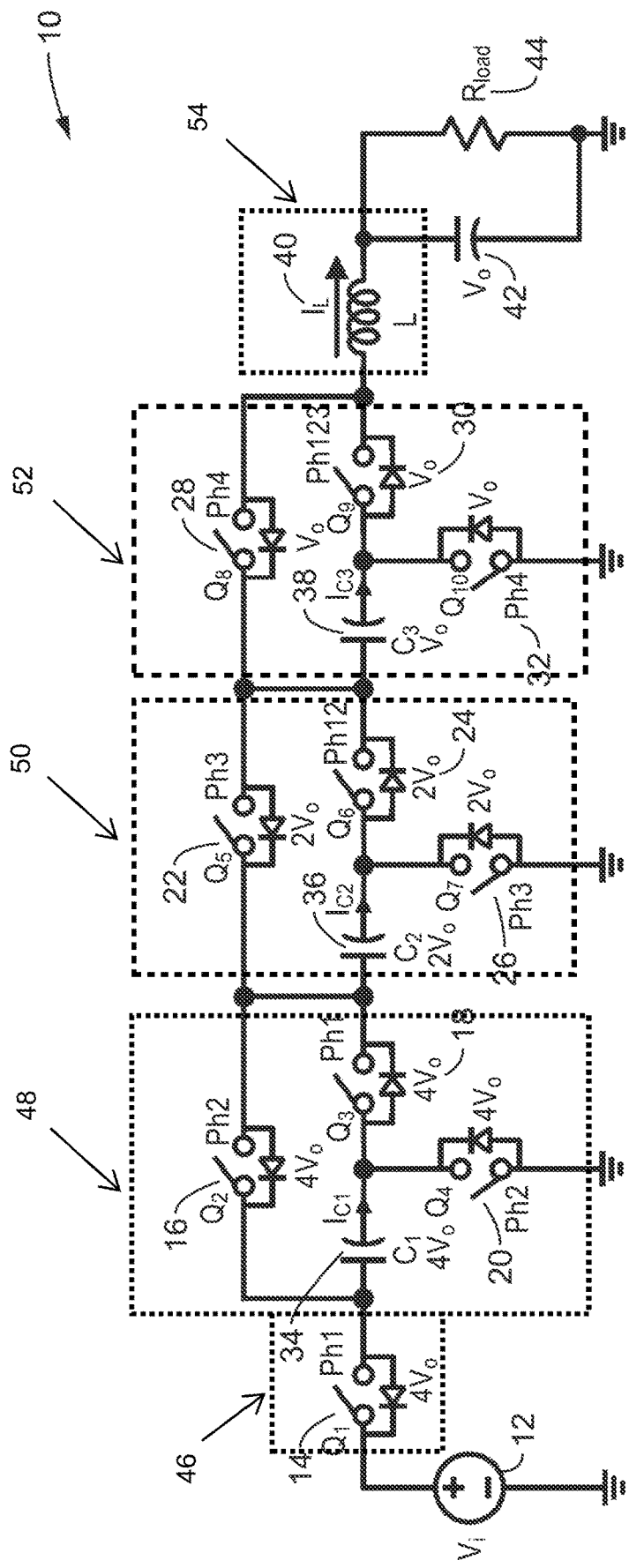
FIG. 1 is a schematic of an 8-to-1 multi-phase resonant SC converter according to at least one embodiment of the present disclosure.

The power consumption of data centers is continuously growing, owing to the advancement of the latest computer science applications (e.g., machine learning, artificial intelligence) and societal lifestyle changes such as due in part to COVID-19. It is therefore imperative to improve system efficiency of data centers, from both economic and environmental perspectives. In terms of data center power delivery, an intermediate bus architecture (IBA) has been widely adopted owing to its high efficiency, good flexibility, and reduced cost. By distributing power at higher server input voltages (e.g., 48 V as compared to conventional 12 V), cabling and busbar conduction losses can be significantly reduced. A major challenge in such systems is the conversion from the 48 V bus to the extreme low voltage and high current operating levels of CPUs and GPUs. To address such a high step-down conversion ratio, a two-stage approach is usually required. One typical solution is a 48-to-12 V bus converter followed by a 12-to-1 V point-of-load (POL) converter. However, recent research suggests that a lower intermediate bus voltage (e.g., 8 V or 6 V) may provide higher overall efficiency, once both the intermediate bus converter and the second-stage buck converter are considered. Therefore, there is an increasing interest and demand in highly efficient bus converters with 6-to-1 or even 8-to-1 conversion ratios.

Traditionally, power converters use either inductor(s) or capacitor(s) as the intermediate energy storage element. However, they both have limitations that affect the achievable power conversion efficiency and power density. A recent direction is a move toward a hybrid-type converter called a hybrid switched-capacitor (SC) converter which uses both capacitors and inductors in the voltage conversion and power transfer process. Since the inductor permits its terminal voltage to change instantaneously, by placing an inductor in the charging/discharging path of SC converters, the majority of the voltage mismatch between capacitors during phase transitions will be present across the inductor, instead of across the switch resistance. This technique, named soft-charging operation, can help reduce/eliminate the capacitor charge sharing loss in conventional SC converters. As a result, smaller capacitance (thereby larger capacitor voltage ripples) can be used without sacrificing efficiency, leading to better capacitor energy utilization.

Given fixed values of flying capacitance and switching frequency, the minimum inductance that allows soft-charging (therefore lowest achievable conduction loss) is determined by the resonant frequency, and a hybrid converter operating in resonant mode is termed herein as a resonant switched-capacitor (ReSC) converter. Since inductor volume is primarily dependent on the current rating, ReSC converters with minimum inductance requirement can be particularly well suited for low voltage, high current applications, such as intermediate bus converters for data centers, where extreme efficiency and power density are critical.

For a given efficiency target, the capacitor and inductor values can be selected to achieve a minimal passive component volume, which can be significantly smaller than that of a conventional SC or a magnetic-based converter. Moreover, because of the resonant nature of its operation, zero current switching (ZCS) can be achieved, and the switching loss caused by the simultaneous existence of switch voltage and current during switching transitions is minimized.

However, the majority of existing ReSC technology focuses on 4-to-1 ratios, and high performance ReSC devices operating with higher conversion ratios have not been widely demonstrated. This limitation has arisen because the number of components (switches and capacitors) increases proportionally with respect to the conversion ratio, and the increased circuit implementation complexity can potentially reduce the theoretical performance benefits.

In the present disclosure a family of resonant switched-capacitor power converters with multiple operating phases per switching cycle is described. Compared with typical SC converters (such as the Dickson and series-parallel) which have two operating phases, multi-phase SC converters can achieve the same conversion ratio with significantly fewer switches and flying capacitors. Even though multi-phase SC converters have been explored previously, prior focus has been on variable conversion ratios for voltage regulation purposes. This technology and its embodiments described herein build upon multi-phase SC converters within embodiments configured for high conversion ratio applications.

A resonant inductor is added to facilitate resonant charging operation. With the proposed control strategy, all flying capacitors in the power converter are softly charged/discharged at different resonant frequencies. This new multi-resonant SC converter architecture can be configured in several variations without departing from the present disclosure.

2. Embodiments of Multi-Resonant-Doubler (MRD) Converters

By way of example and not limitation, embodiments are described herein for an 8-to-1 version and a 6-to-1 version, and other variations. These first specific embodiments are described as each utilizing 10 switches and 3 flying capacitors, although the technology is not limited as to the number of required switches and flying capacitors. In addition, it should be appreciated that given additional switches and flying capacitors, the architecture can be extended to achieve higher conversion ratios.

It should also be appreciated that the multi-resonant converters of the present disclosure are two port bi-directional devices. For example when coupling an input source to the first port and output load to the second port the converter operates as a down converter (scaling down the voltage); whereas coupling the input source to the second port and output load to the first port provides an up converter (scaling up the voltage). The following examples describe the down converter aspect of the present disclosure, however, it should be realized that by swapping the input and output an up converter can be realized.

2.1. Four-Phase 8-to-1 ReSC Converter

FIG. 1 illustrates an example embodiment 10 of a four-phase 8-to-1 ReSC converter. The circuit has a fundamental multi-phase structure, and can be viewed as one practical circuit implementation of a multi-phase voltage doubler that achieves the theoretical maximum gain with a minimal number of components (e.g., 3 flying capacitors and 10 switches for a gain of 8).

In the circuit is shown in input power source 12 with voltage Vi to a first switch 14 of a series switching path for the flying capacitors 34, 36 and 38. This series path is shown with switch 14, capacitor 34, switch 18, capacitor 36, switch 24, capacitor 38, and switch 30 which is coupled to an inductor 40 to an output load having capacitance 42 and resistance 44. Interstage switching is depicted through switches 16, 22 and 28, while grounding switches 20, 26 and 32 are shown.

The ReSC converter has the following stages: a first switch 46 leading into a front end 2:1 stage (doubler) 48, a second SC stage 50 (e.g., 2:1 doubler), followed by one or more SC stages 52, the last of which couples to a resonant inductor stage 54.

By way of example and not limitation, the switches are shown with body diodes which are in inherent part of a MOSFET switch. In the present disclosure various forms of switches, capacitors and inductors may be utilized across a wide range of applications without departing from the teachings of the present invention.

The present disclosure asserts a new implementation of this form of structure, by adding a resonant inductor 40 at the switch node and then operating the circuit as a multi-phase ReSC converter. Because of the voltage doubler structure, the flying capacitors carry binary voltages (C1=4Vo, C2=2Vo, C3=Vo) and the switches see the same voltage as that of the corresponding capacitors (Q1 through Q4=4Vo, Q5 through Q7=2Vo, and Q8 through Q10=Vo).

It should be appreciated that the recitation of a capacitor value (e.g., C1, C2, or C3) does not imply that this comprises a single physical capacitor as multiple physical capacitors are often coupled together to create a given topological capacitance value. In similar manner, a given topological inductor value may be attained by connecting multiple physical inductors.

A 48-to-6 V, 40 A, fixed ratio converter prototype was built and tested to demonstrate the correct functionality of the invention. The prototype achieved 98.6% peak efficiency (98.0% including gate drive loss) and 1675 W/in³ power density, achieving one of the best overall in-class performances.

Figure 2:
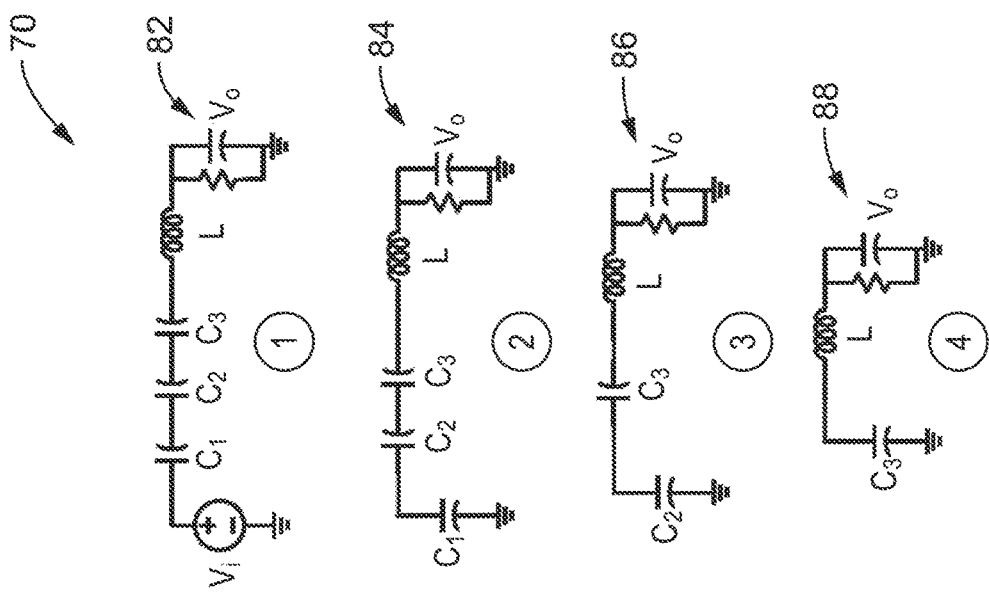
FIG. 2 are waveform diagrams of the 8-to-1 multi-phase resonant SC converter of FIG. 1 according to at least one embodiment of the present disclosure.
Figure 2:
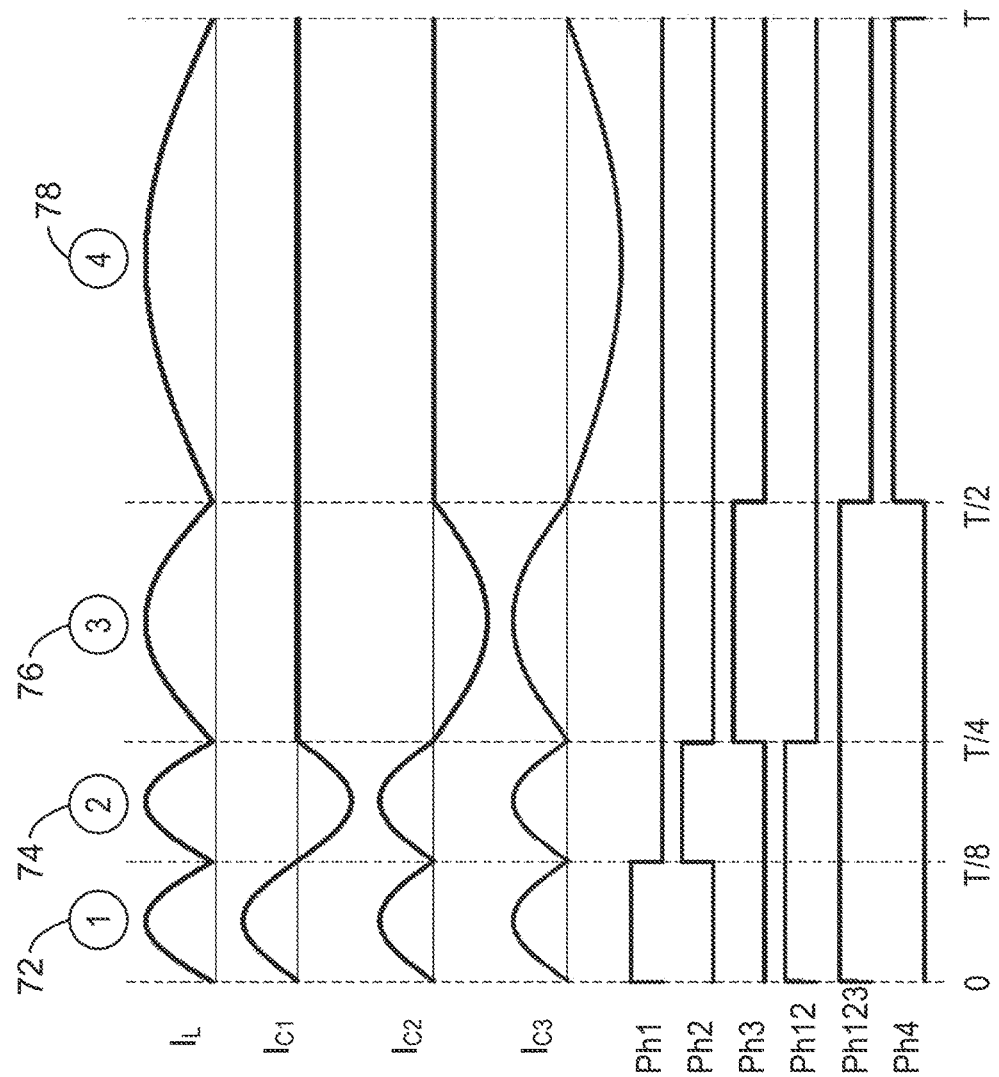

FIG. 2 illustrates an example embodiment 70 of key control signals, inductor current waveforms ($I_L$), and capacitor current waveforms ($I_{C1}$, $I_{C2}$, $I_{C3}$) and the phase drive signals Ph1, Ph2, Ph3, Ph12 (Ph1+Ph2), Ph123 (Ph1+Ph2+Ph3), and Ph4 (inverse of Ph123). The four phases of operation 72, 74, 76 and 78 are seen across the top of the left side of the figure, while the associated equivalent circuit representations for each phase are shown 82, 84, 86 and 88 at the right side of the figure.

All flying capacitors are charged and discharged in a resonant fashion, resulting in soft-charging and zero-current switching (ZCS). The detailed operation of the four phases are as follows:

Phase 1: The "Ph1", "Ph12" and "Ph123" switches in FIG. 1 are ON. C1, C2, C3 and L are connected in series, depicted by equivalent circuit 82. All flying capacitors are resonantly charged by the input. The duration of phase 1 is ⅛ of the switching cycle. The equivalent resonant frequency of this phase is:

$$f_{r,ph1} = \frac{1}{2\pi\sqrt{LC_{eq1}}}$$

where $$\frac{1}{C_{eq1}} = \frac{1}{C_1} + \frac{1}{C_2} + \frac{1}{C_3}.$$

Phase 2: The "Ph2", "Ph12" and "Ph123" switches are ON. In this phase, all flying capacitors are still connected in series, except for C1 which is being discharged into C2 and C3, depicted with equivalent circuit 84. The length of the phase and the equivalent resonant frequency remain the same as those of phase 1.

Phase 3: The "Ph3" and "Ph123" switches are ON. In this phase, C1 is disconnected and C3 is only charged by C2, depicted by associated equivalent circuit 86. In order to maintain capacitor charge balance, the duration of this phase is doubled to ¼ of the switching cycle. The equivalent resonant frequency of this phase is now:

$$f_{r,ph3} = \frac{1}{2\pi\sqrt{LC_{eq3}}}$$

where $$\frac{1}{C_{eq3}} = \frac{1}{C_2} + \frac{1}{C_3}.$$

Phase 4: Only the "Ph4" switches are ON. In this phase, both C1 and C2 are disconnected and C3 is resonantly discharged to the load, this phase is depicted by associated equivalent circuit 88. The equivalent resonant frequency of this phase is:

$$f_{r,ph4} = \frac{1}{2\pi\sqrt{LC_{eq3}}}.$$

Since the duration of this phase is one-half of the switching cycle, the overall switching frequency with four phases combined would be the same as $f_{r,ph4}$ in which $$f_{sw} = f_{r,ph4} = \frac{1}{2\pi\sqrt{LC_3}},$$

which is only determined by L and C3.

By equating the relative length of different phases and the corresponding resonant frequency, the required ratio of the flying capacitors can be found to be C1=⅟₁₂ C3 and C2=⅓ C3. These reduced capacitance requirements are due to the fact that the resonant charging currents of C1 and C2 are at higher frequencies than C3. It indicates that even though C1 and C2 must be rated for higher voltages than C3, their physical volume could still be very similar due to their reduced capacitance.

Moreover, these capacitor ratios relate to two operational constraints. First, these exact ratios are needed to achieve ZCS for all switches. Secondly, these ratios determine the minimal capacitor values that are needed to achieve soft-charging operation. In practical implementations, it is very challenging to maintain an exact capacitor ratio. Nevertheless, the soft-charging operation is guaranteed as long as the actual capacitors exceed their minimum required values. In practice, the imperfect ZCS operation due to capacitor ratio mismatch was found to have a relatively minor effect on the performance of the converter.

2.1.1. Performance Comparison

The example converter of FIG. 1 with its waveforms in FIG. 2 is utilized as an example to compare the performance of multi-phase SC converters with typical two-phase SC converters. For discrete implementations (especially for low-voltage applications), both the number of switches (and the associated gate drive circuitry) and the number of passive components required can significantly impact the size of the resultant converter.

Table 1 compares the required number of components of the MRD and other 8-to-1 SC converters. It can be seen that the MRD uses fewer components than these other topologies, including the cascaded resonant converter (a type of two-phase voltage doubler) and the Fibonacci converter, which is at the theoretical lower limit of two-phase SC converters.

Moreover, as shown in Table 2, when considering the total passive component volume from the fundamental energy transfer perspective, the doubler-based topologies are found to have excellent passive component utilization among all topologies. In light of these reasons, the MRD has the potential to achieve higher power density than its two-phase counterparts.

Nevertheless, reducing the number of switches can result in higher switch VA rating and output impedance (which negatively impacts efficiency). Assuming all switches have the same on-resistance R, which is often the case for applications lower than 25 V due to limited discrete power MOSFET selection, the output impedance of the MRD is 2.75R with the minimum number of switches (10 switches), which is higher than the other topologies. If conduction loss is a major concern, more switches can be paralleled in the key current paths. The output impedance can be reduced to 2R with 13 switches, or 1.25R with 22 switches, resulting in comparable output impedance to other topologies with a similar number of total switches. Fundamentally, there is not any win-win situation that can achieve low component count and low output impedance simultaneously. The Dickson and Series-Parallel converters can provide low output impedance because they use a large number of switches to split the current into multiple parallel paths. In comparison, the MRD uses fewer switches but it has only one current path and therefore higher output impedance.

However, in practical implementations, the low required switch count of the MRD can make it more adaptable to different applications compared to two-phase topologies with an inherently large number of switches and the associated gate drivers. Depending on the design specifications, more switches can be paralleled to reduce output impedance, without requiring additional gate drive circuits. In addition, the low component count can simplify PCB layout and increase power density.

Since PCB loss contributes in large measure to the overall loss for low-voltage high-current applications, a clean and simple PCB layout is important for achieving a high-performance design.

2.1.2. Hardware Implementation and Experimental Results

A prototype was built of the circuit in FIG. 1 having dimensions of 1.38×0.46×0.22 inches (3.5×1.17×0.55 cm). Table 3 lists principle operating characteristics of input voltage, output voltage, output current, power rating and switching frequency for this converter. In view of the reduced voltage stress because of the doubler topology, low voltage silicon MOSFETs can be utilized (40 V for Q1 through Q4 and 25 V for Q5 through Q10). In order to reduce the output impedance, Q8 through Q10 are each implemented with two paralleled switches, one on each side of the board. The cascaded bootstrap method is used to power the floating gate drivers. When operating in forced continuous-conduction mode, the inductor current may go negative at light load. When all switches are OFF during deadtime, the body diodes of Q1, Q2, Q5, and Q8 will conduct to keep the current flowing, and therefore connect the switch node to the input. This may result in excess voltage stress on certain switches and thus a zener diode was added to the switch node to reduce voltage transients. By way of example and not limitation, the printed-circuit board (PCB) comprised four layers and was fabricated with a thicker 4 oz copper on the outer layers (where the critical conduction path is) and lighter 3 oz copper on the inner layers.

The minimum switching frequency is determined by the inductor and the capacitor C3, where $$f_{sw,min} = \frac{1}{2\pi\sqrt{LC_3}}.$$

However, to counteract the effects of non-idealized (real-world) components and further reduce conduction loss, the converter can be operated at a frequency that is slightly higher than the resonance frequency, at the moderate expense of imperfect ZCS operation and slightly increased switching loss. For this prototype, $f_{sw,min}$=52 kHz and the actual switching frequency is 70 kHz when operating at 48-to-6 V. The converter is also able to handle large load transients, and does not show significant undershoot after a 10 A to 40 A load step, after which it stabilizes within a few switching cycles.

The converter has been tested up to a 40 A output current. Based on the volume of the smallest rectangular box that can contain the converter, the power density is 1675 W/in³ (102 kW/L) for 48-to-6 V conversion and 2100 W/in³ (128 kW/L) for 60-to-7.5 V conversion. The efficiency was measured with a precision power meter for various input voltages. For the nominal 48-to-6 V conversion, the peak efficiency is 98.6% (98.0% including gate drive loss). The full load efficiency at 40 A is 96.0% (95.9% including gate drive loss). This high efficiency performance can greatly reduce the thermal management requirement. The converter was found to maintain a maximum temperature around 60 degrees Celsius at full power with fan cooling only. Additionally, the high efficiency also reduces the impact of load regulation. Even though the converter operates in fixed-ratio mode (open loop), the output voltage only droops by 250 mV (4.2% of Vout) at full load.

To better understand the operation and the potential improvements of the MRD converter, a loss analysis was performed. It was found that the conduction loss from the switches and the PCB represents the greatest portion of the overall loss, especially at heavy load conditions. Even though the switching frequency is relatively low, improved soft-switching techniques are utilized because the switching loss is not insignificant due to hard switching.

One of the benefits of the near-zero volt-second across the resonant inductor, is that low-profile one-turn inductors with small core sizes and low winding losses can be utilized which result in ultra-low magnetic-related losses. In comparison, the loss from the capacitors is higher. Even though the capacitor ESR is low (e.g., about 0.2 to 0.3 mΩ after paralleling 16 SMD 0805 packaged capacitors), the associated root-mean-square (rms) current can be significant (e.g., greater than $I_{out}$ for C3), contributing nearly 10% of the overall loss at the full power point. In practice, the capacitor loss for the large swings encountered here may be increased, due to non-linear losses in Class II dielectrics. For reliability purpose, the allowable ripple current flowing through each capacitor needs to be constrained to limit the component temperature rise. This requirement often determines the minimum number of required capacitors, which cannot be reduced by increasing the switching frequency. Another note is that the gate drive loss can subsume up to a quarter of the total loss at the peak efficiency point, reflecting the importance of a proper gate drive design. There are a number of factors that need to be considered, such as the trade-off between switch gate charge and on-resistance, the selection of gate drive voltage, and the method(s) to provide power to the floating gate drivers.

2.2. Three-Phase 6-to-1 ReSC Converter

Figure 3:
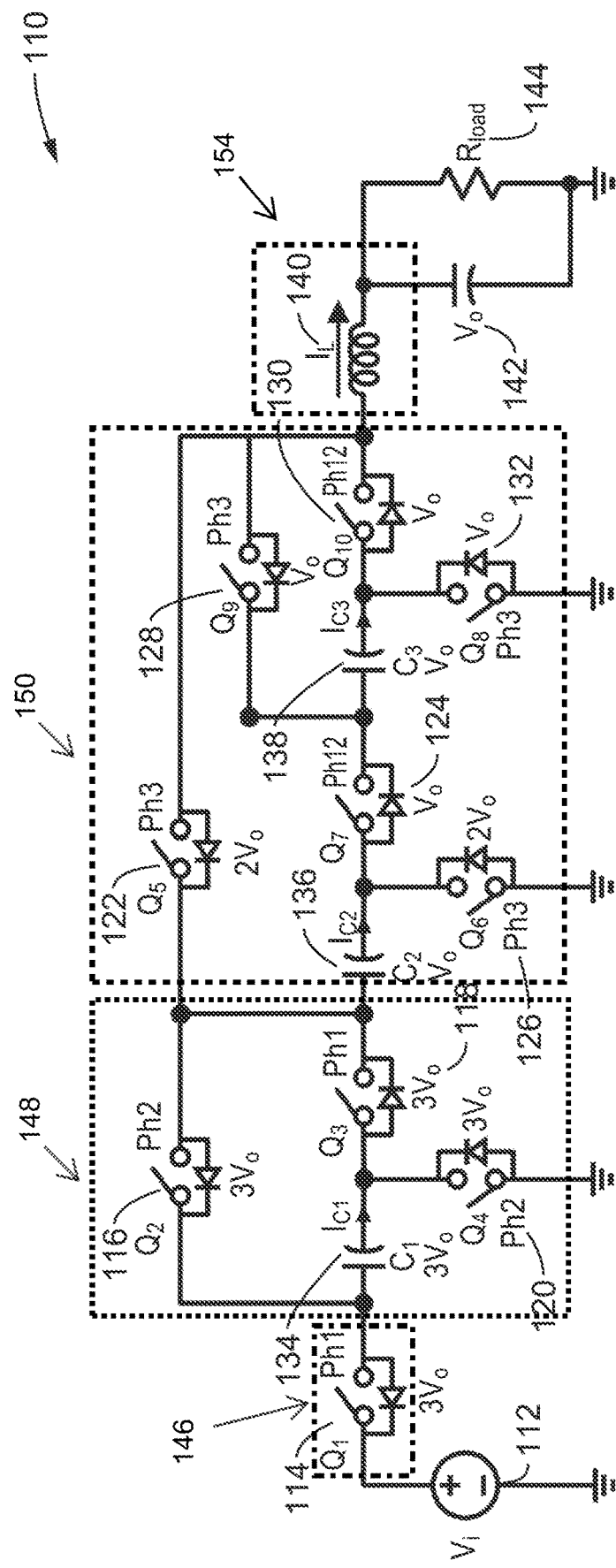
FIG. 3 is a schematic of a 6-to-1 multi-phase resonant SC converter according to at least one embodiment of the present disclosure.

FIG. 3 illustrates an example embodiment 110 of a three-phase 6-to-1 ReSC converter. This circuit topology can be derived from the 8-to-1 topology, by moving the source terminal of Q5 from the drain of Q9 to the source of Q9 in creating a 3-to-1 parallel mode operation. The converter achieves a 2-to-1 step-down during the first one-third (⅓) of the switching period through a series-mode operation, followed by a 3-to-1 parallel mode operation during the last two-thirds (⅔) of the switching period. This converter therefore can achieve a 6-to-1 conversion ratio for the same number of switches and capacitors as the classic 4-to-1 series-parallel converter, although the device ratings on one switch and one capacitor are increased from Vo for the 4-to-1 converter to 3Vo for the 6-to-1 converter.

The circuit 110 is shown having input power source 112 with voltage Vi to a first switch 114 of a series switching path for the flying capacitors 134, 136 and 138. This series path is shown with switch 114, capacitor 134, switch 118, capacitor 136, switch 124, capacitor 138, and switch 130 which is coupled to an inductor 140 to an output load having capacitance 142 and resistance 144. Interstage switching is depicted through switches 116, 122 and 128; although switch 128 is used differently than in FIG. 1 as already described. Grounding switches 120, 126 and 132 are shown in similar manner as FIG. 1.

The depicted ReSC converter has the following stages. A series switch 146 is used to control the connection of the first SC stage 2:1 (doubler) 148, followed by a second SC stage 150 as a 3:1 stage, such as a series-parallel SC stage, after which is a resonant inductor stage 154.

The cells in this example include switches 116, 118, 120 and capacitor 134 in a cell of stage 148. Switches 122, 124, 126 and capacitor 136 comprise the first cell of stage 150, while switches 128, 130, 132 and capacitor 138 comprise the second cell of that same stage.

Figure 4:
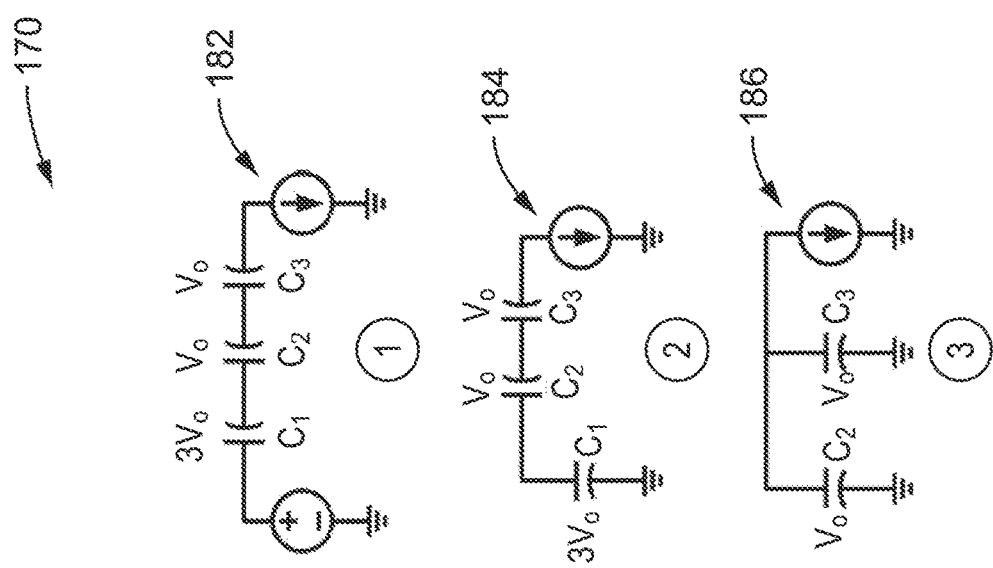
FIG. 4 are waveform diagrams of inductor and capacitor current and control signals for the 6-to-1 multi-phase resonant SC converter of FIG. 3 according to at least one embodiment of the present disclosure.
Figure 4:
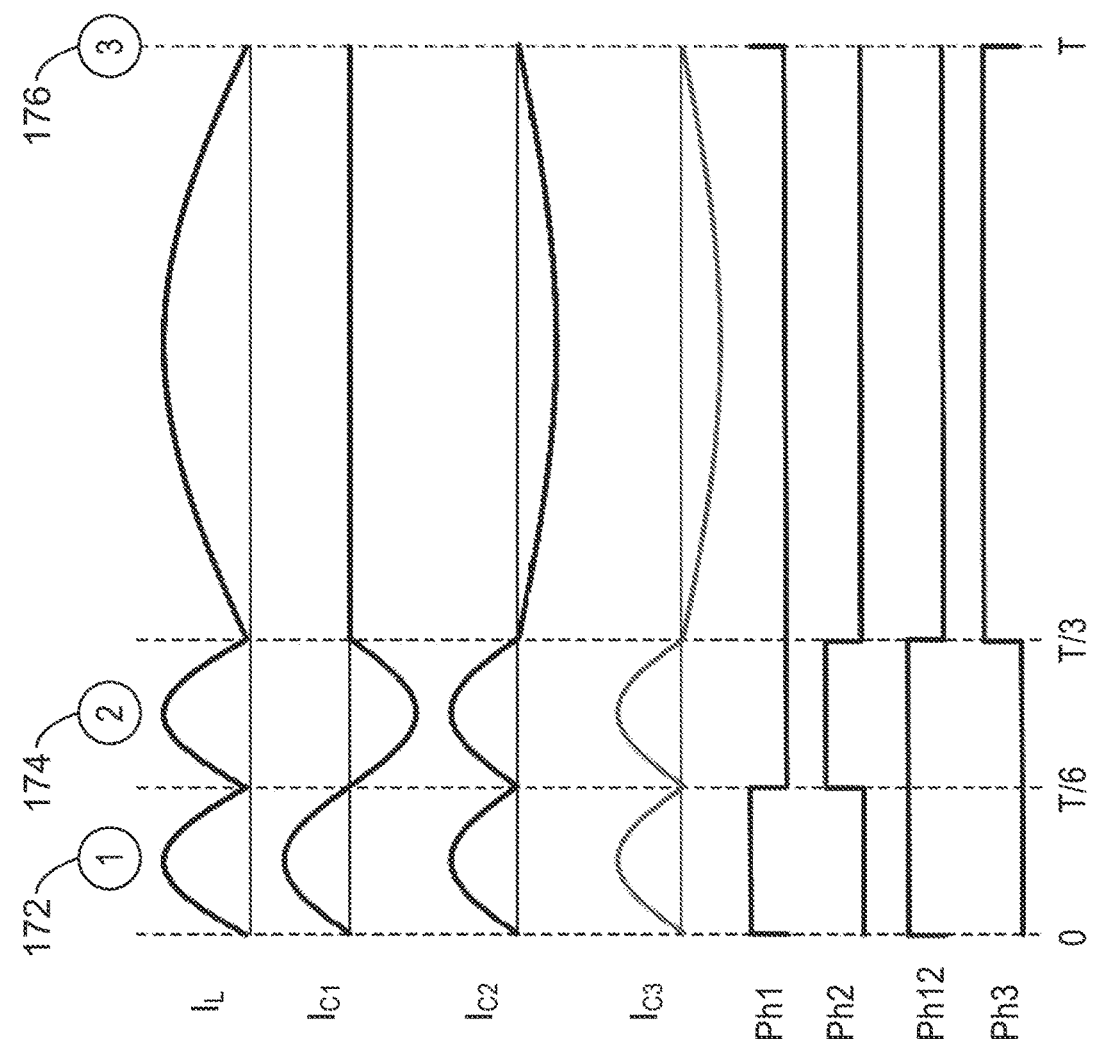

FIG. 4 illustrates an example embodiment 170 of current waveforms in the inductor and flying capacitors C1-C3, gating signals, and equivalent circuits 182, 184 and 186 for each phase 172, 174 and 176.

In view of the three-phase operation, this converter can be viewed as a 2-to-1 converter cascaded with a 3-to-1 Series-Parallel converter, and is therefore referred to here as a Cascaded Series-Parallel (CaSP) converter. Benefitting from multi-phase operation, this topology uses fewer switches and capacitors than other two-phase 6-to-1 SC converters. Although its conversion ratio is not quite as high as that of the MRD converter, its series-parallel stage can split the output current into two paths, thus reducing the conduction loss and improving conversion efficiency.

This CaSP converter achieves a 2-to-1 step-down during the first one-third (⅓) of the switching period through a series-mode operation, followed by a 3-to-1 parallel-mode operation during the last two-thirds (⅔) of the switching period. The detailed operation of the three phases are as follows.

Phase 1: The "Ph1" and "Ph12" switches in FIG. 4 are ON and capacitors C1, C2, C3 and inductor L are connected in series. All flying capacitors are resonantly charged by the input. The duration of Phase 1 is one-sixth (⅙) of the switching cycle. The equivalent resonant frequency of this phase is determined by the series combination of C1, C2, C3, and the inductor L, as:

$$f_{r,ph1} = \frac{1}{2\pi\sqrt{LC_{eq1}}},$$

where $$\frac{1}{C_{eq1}} = \frac{1}{C_1} + \frac{1}{C_2} + \frac{1}{C_3}.$$

Phase 2: The "Ph2" and "Ph12" switches are ON. In this phase, all flying capacitors are still connected in series, but C1 is being discharged. The length of the phase and the equivalent resonant frequency remain the same as in Phase 1.

Phase 3: Only the "Ph3" switches are ON. In this phase, C1 is disconnected, C2 and C3 are in parallel, and are resonantly discharged to the load. The equivalent resonant frequency of this phase is $$f_{r,ph3} = \frac{1}{2\pi\sqrt{L(C_2 + C_3)}}.$$

The parallel operation in Phase 3 demands that C2=C3=C, while capacitor charge balance analysis of C1 indicates that the minimum value for C1 which is required to achieve soft-charging operation is $C_{1,min}=\frac{1}{6}C$.

Theoretical performance was compared with various ReSC converters, including a buck converter for use at a 6-to-1 conversion ratio. It was found that the proposed CaSP converter can achieve similar theoretical performance to the Series-Parallel converter even with a greatly reduced number of components. This is significant as the passive volume of the Series-Parallel topology is known to be at the theoretical lower limit. Compared to the switched-tank converter (STC), the CaSP converter can potentially achieve higher power density, even though the switch stress is higher. Moreover, the efficiency performance of the Series-Parallel based converters is underestimated by the switch VA analysis, when the switches cannot be sized optimally due to limited selections in discrete designs. This is often the case for ReSC-based 48 V bus converters for data centers, since discrete power MOSFETs below 25 V are not readily available and different topologies may end up using the same devices. As a result, the Series-Parallel based topologies with good passive component utilization are more favored, as their disadvantageous switch utilization is relatively mild considering the actual switches available.

2.2.1. Experimental Results

The prototype of the 8-to-1 MRD converter of FIG. 1 was modified to operate as a 6-to-1 CaSP converter, by assigning Q5 and Q8 the same control signal. All components remain the same, except that C2 and C3 are changed to have the same capacitance. The converter has been tested up to 40 A at 48-to-8 V conversion, and found to have a power density of 2230 W/in³.

The efficiency was measured to be 99.0% peak efficiency (98.5% including gate drive loss) and 97.1% (97.0% including gate drive loss) full-load efficiency. The loss breakdown of the converter was found to be of similar composition as the MRD converter. The measured efficiency and power density numbers have approached those of known cascaded resonant converters with a 4-to-1 ratio, thus demonstrating the great potential of this CaSP topology. It should be noted that the tested hardware is designed for the MRD converter with the source terminal of Q5 connected to the drain terminal of Q8. Consequently, Q8 in fact carries all of the output current rather than half as shown in FIG. 4. With a hardware specifically optimized for this topology, higher efficiency performance can be expected.

2.3. Parallel Operation for Higher Output Power

FIG. 5A and FIG. 5B illustrate an example embodiment 210, 230 of parallel operation for the converters of the present disclosure in optimizing the utilization of the flying capacitors and the associated switches.

Owing to the nature of multi-phase operation, certain elements of the converter only operate for a portion of the switching period. The closer the capacitor to the input, the shorter the operating period. For example C1 blocks 4Vo and it operates for ¼ T; C2 blocks 2Vo and it operates for ½T; C3 blocks Vo and it operates for the entire time T. This unique characteristic, referred to herein as an "increasing phase time hierarchy", can allow for a reduction in component counts and PCB space (board real-estate) in providing interleaved parallel operation for gaining higher output powers.

From FIG. 5A, it can be seen that C1 only operates for the first T/4 and C2 only operates for the first T/2. They are not being actively used (i.e., doing energy transfer) for the rest of the time within a switching period T. By having multiple parallel branches, C1 can be used to engage with up to four secondary stages, at 0-T/4, T/4-T/2, T/2-3T/4, and 3T/4-T, respectively. In this way, the "idle state" of C1 is eliminated as it is always actively doing energy transfer for one of the parallel converters. This same principle applies for C2 as well, for example engage two secondary stages.

Because of the nature of cascading, the output voltage of the preceding stage becomes the input of the following stage. Therefore, the capacitors and switches at the stages closer to the input need to withstand higher voltages than those in the stages closer to the output. To maintain capacitor charge balance of all flying capacitors, the higher voltage capacitors closer to the input need to conduct less time than the lower voltage ones closer to the output.

This is seen in FIG. 5B, since the first doubler stage (8Vo to 4Vo) 232 only operates for one quarter of the period, it can be used to drive four paralleled phases 234 (with 90 degrees phase shift each), only at the cost of increased switching frequency (thereby switching loss) of the first stage and four additional switches for the four parallel phases in the second stage. Similarly, each doubler at the second stage 234 (4Vo to 2Vo) can drive two following stages 236 (2Vo to Vo). This arrangement can contribute toward fully utilizing the availability of all circuit components, and save space and cost compared to conventional interleaving designs that must rely on straightforward converter paralleling due to their topologies.

3. Converter Family

The following describes aspects of this converter family having resonant switched-capacitor power converters with multiple operating phases per switching cycle. First a generalization of FIG. 1 and FIG. 3 are provided, followed by a single SC cell, and then some embodiments in the family based on FIG. 1 and FIG. 3.

Figure 6:
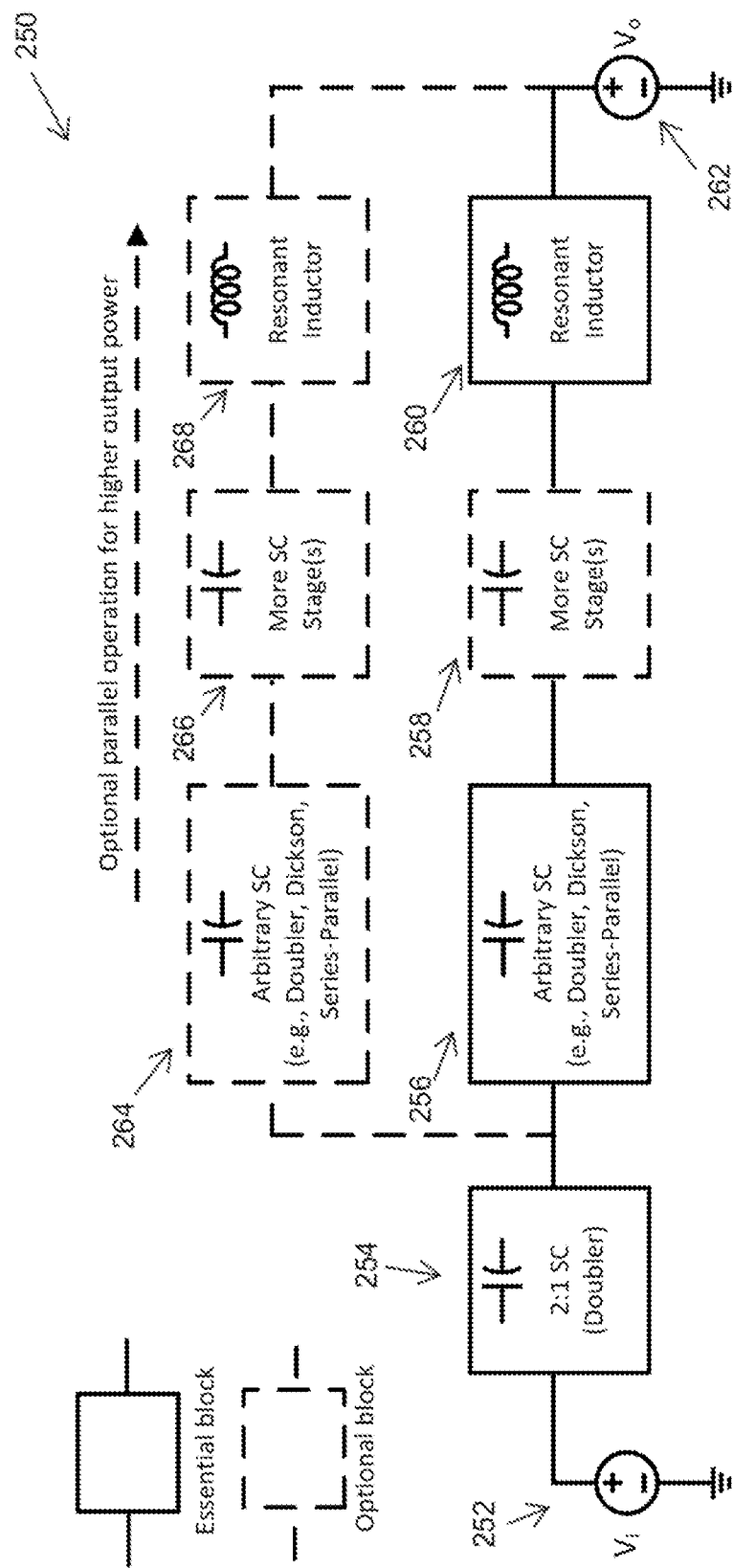
FIG. 6 is a block diagram of a multi-phase resonant SC converter according to at least one embodiment of the present disclosure.

FIG. 6 illustrates an example embodiment 250 of an ReSC converter. An input power source 252 is seen with voltage Vi to a first stage 254 comprising a 2:1 SC stage (e.g., doubler), which is followed by an arbitrary SC stage 256, which for example may comprise any desired conversion stage, such as a doubler, a Dickson, a series-parallel, and so forth. Optionally, additional SC stages 258 may be coupled in series. A resonant inductor stage 260 is coupled to load 262 after the last series SC stage. This example is shown with optional stages 264, 266 and 268 to provide parallel operation toward reaching higher output power.

It should be appreciated that this multi-resonant switched-capacitor architecture is bi-directional in nature. Similar to classical buck and boost converters, step-up conversion can be achieved by exchanging the input voltage source and the output load. This way, the input source is first connected to the resonant inductor, followed by one or more SC stages, with the last stage being the 2:1 SC doubler that is connected to the output.

Figure 7:
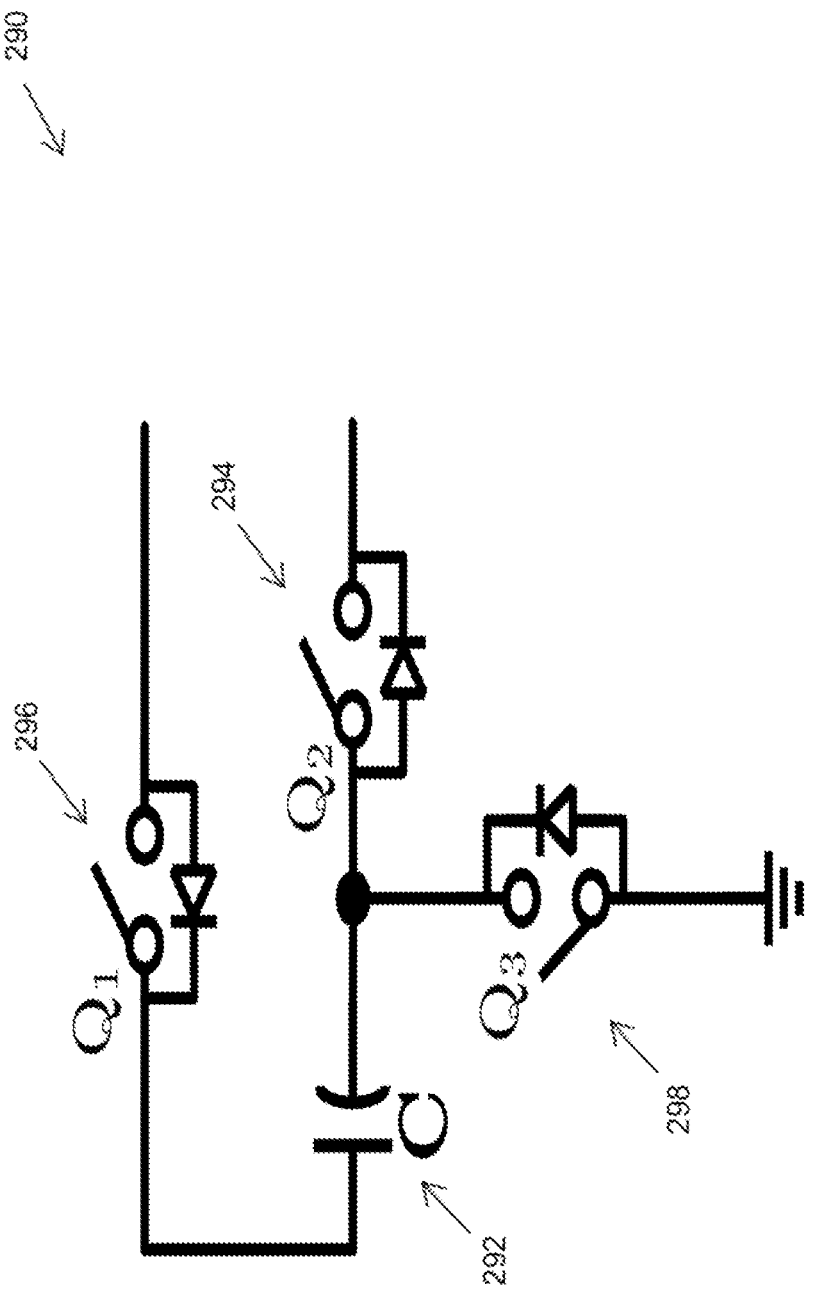
FIG. 7 is a schematic of one cell of the multi-phase resonant SC converter according to at least one embodiment of the present disclosure.

FIG. 7 illustrates an example embodiment 290 of a cell being utilized in the resonant switched-capacitor power converter having multiple operating phases per switching cycle. A flying capacitor 292 is shown which is configured for series connection with the input or a preceding stage. A series switch 294 is configured for connecting capacitor 292 with the capacitor in the following cell or stage. A ground switch 298 allows connecting capacitor 292 output to ground. A switch 296 is configured for selectively coupling capacitor 292 to some subsequent cell or stage.

Figure 8:
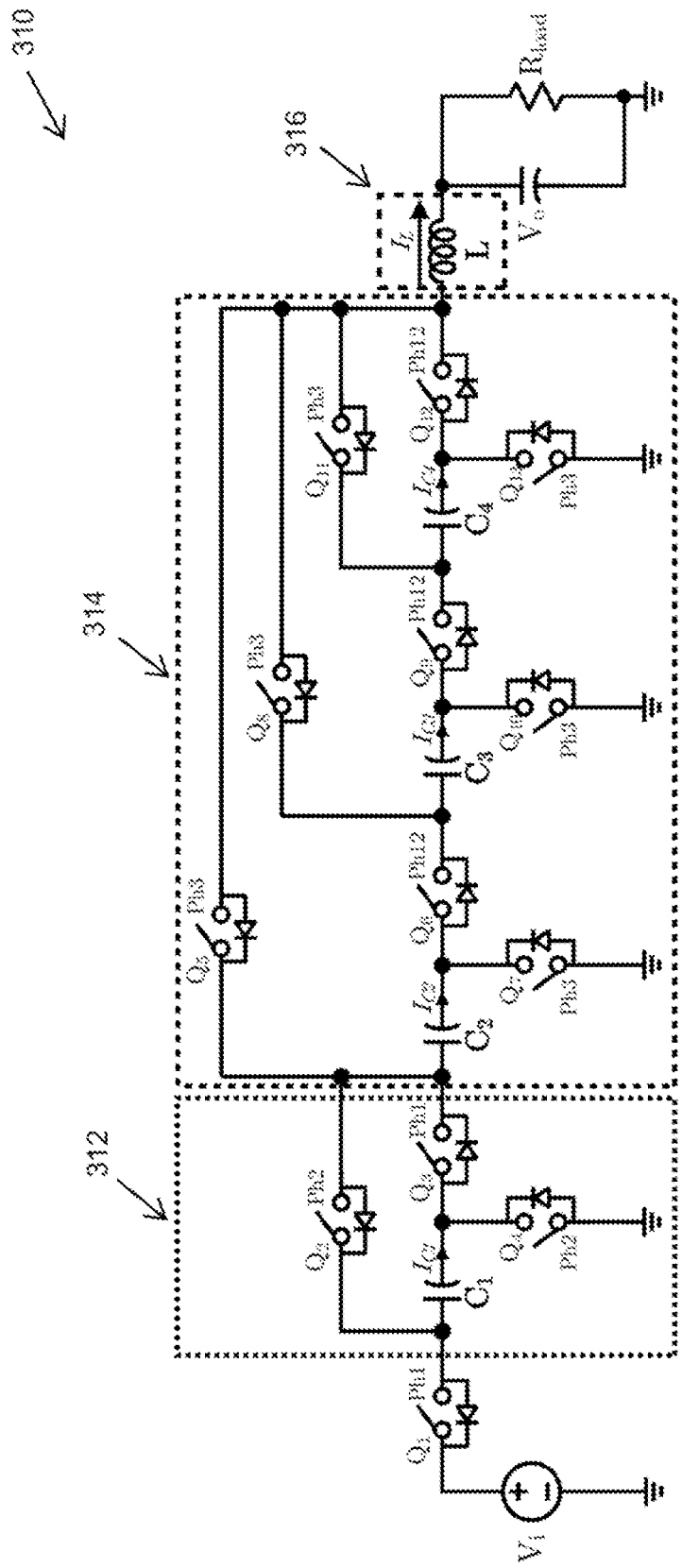
FIG. 8 is a schematic of an 8-to-1 CaSP converter according to at least one embodiment of the present disclosure.

FIG. 8 illustrates an example embodiment 310 of an 8-to-1 CaSP converter operating with three phases. The figure is similar to FIG. 3, but is configured with a doubler stage 312, 4:1 series-parallel stage 314 and resonant inductor stage 316 coupled to the load.

Figure 9:
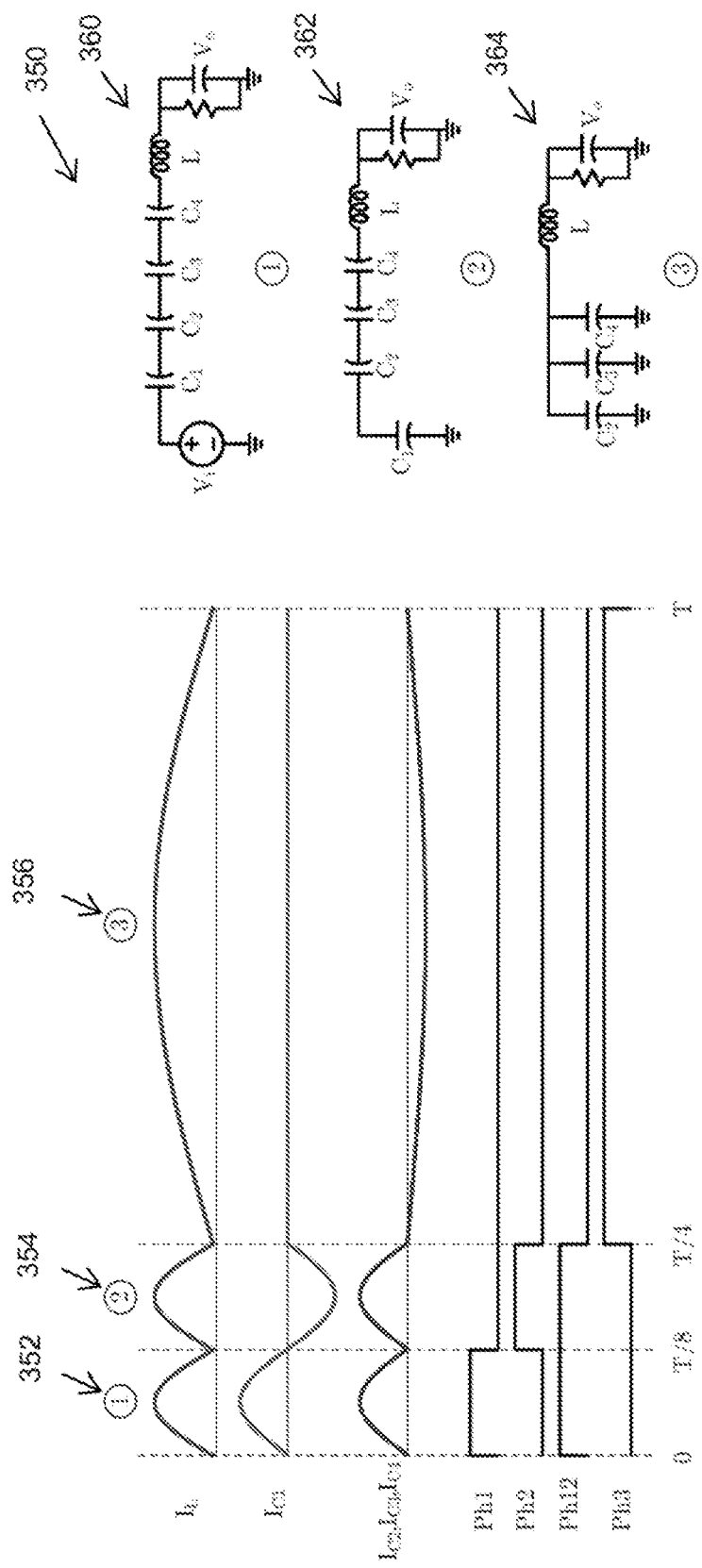
FIG. 9 are waveform diagrams of the 8-to-1 CaSP multi-phase resonant converter of FIG. 8, according to at least one embodiment of the present disclosure.

FIG. 9 illustrates an example embodiment 340 of the waveforms and equivalent circuits for the converter of FIG. 8. In the figure the three phases 352, 354, and 356 are shown with the waveforms, while the equivalent circuits 360, 362 and 364 are shown on the right.

Figure 10:
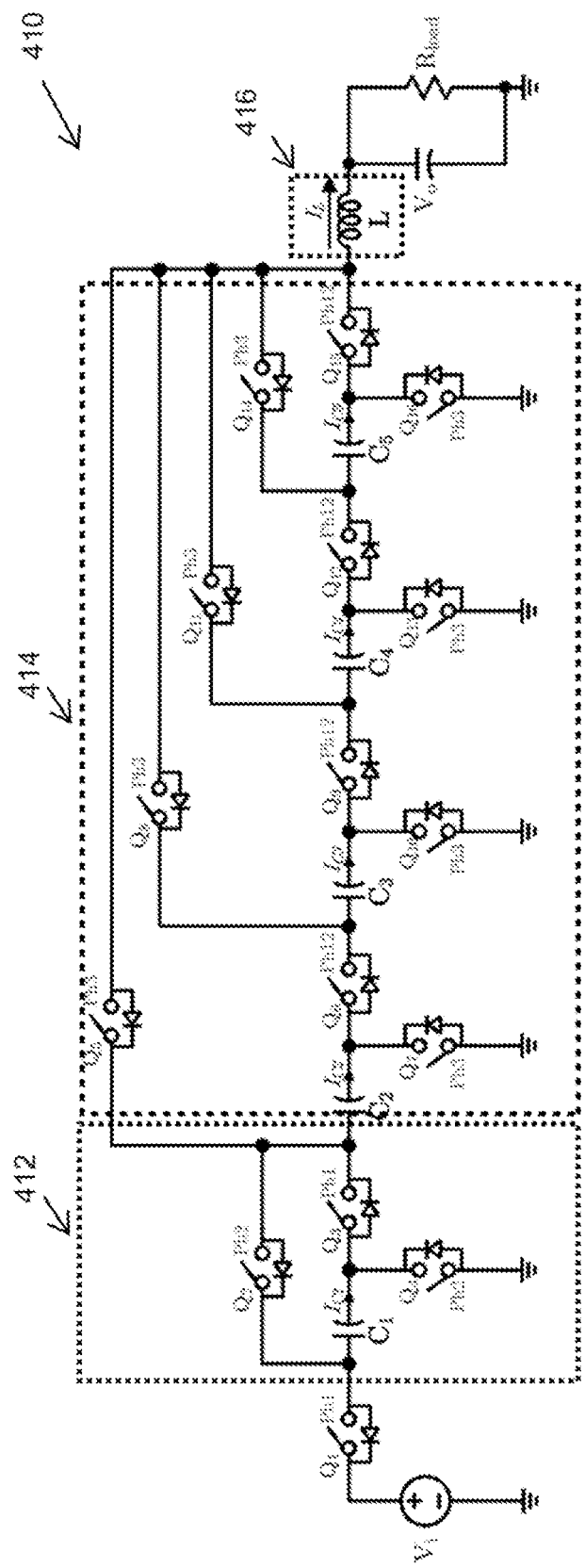
FIG. 10 is a schematic of an 10-to-1 CaSP converter (three phase) according to at least one embodiment of the present disclosure.

FIG. 10 illustrates an example embodiment 410 of an 10-to-1 CaSP converter operating with three phases. The figure is similar to FIG. 3, but is configured with a doubler stage 412, 5:1 series-parallel stage 414 and resonant inductor stage 416 coupled to the load.

Figure 11:
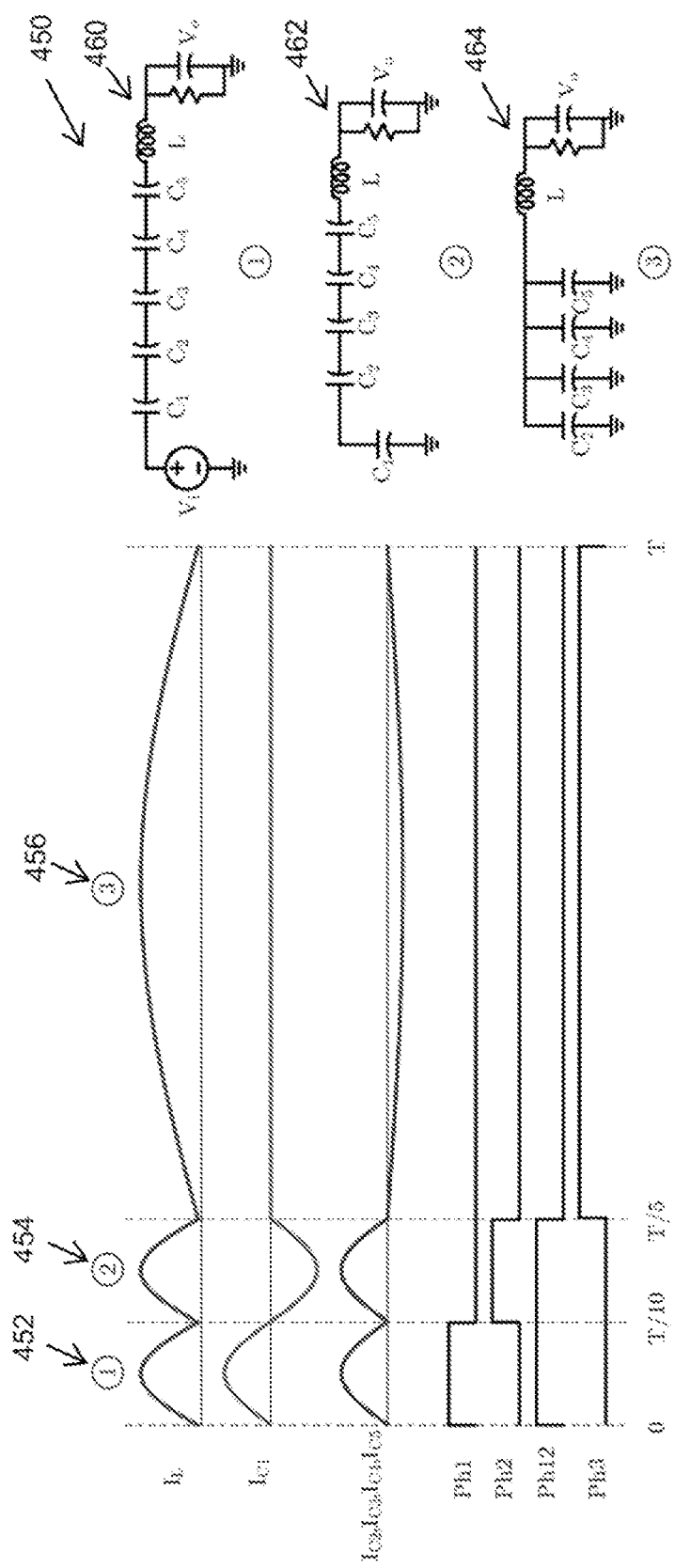
FIG. 11 are waveform diagrams of the 10-to-1 CaSP multi-phase resonant converter of FIG. 10, according to at least one embodiment of the present disclosure.

FIG. 11 illustrates an example embodiment 450 of the waveforms and equivalent circuits for the converter of FIG. 10. In the figure the three phases 452, 454, and 456 are shown at the left with the waveforms, while the equivalent circuits 460, 462 and 464 are shown on the right.

Figure 12:
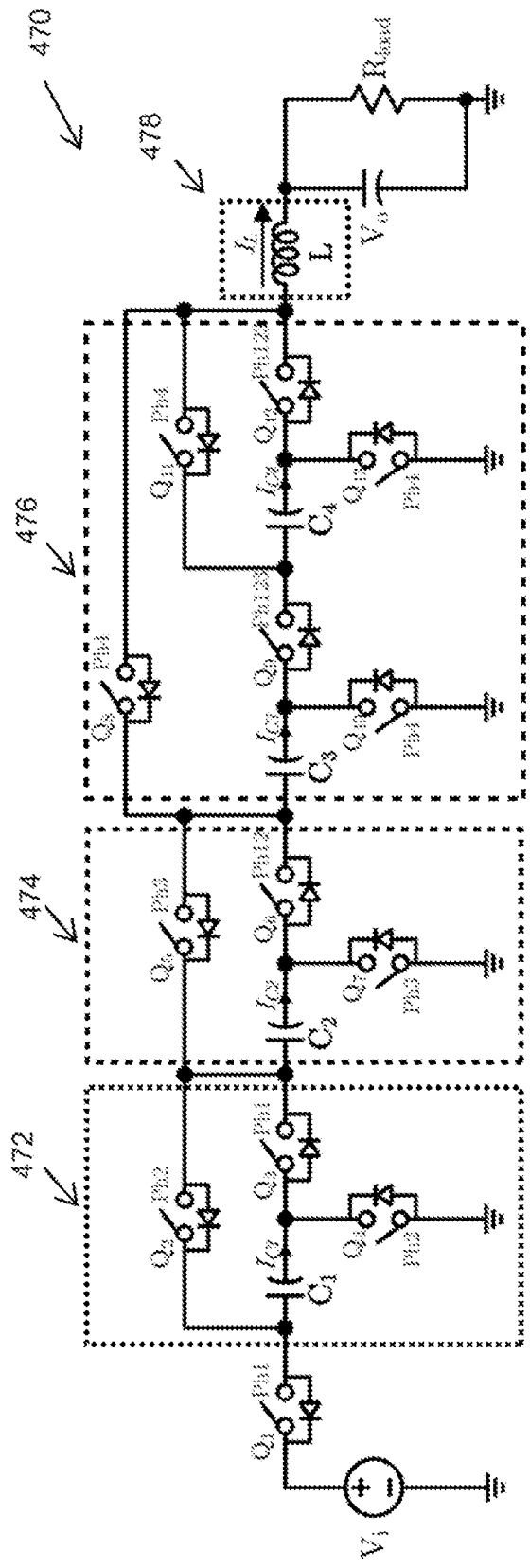
FIG. 12 is a schematic of an 12-to-1 cascaded doubler series-parallel converter (four phase) according to at least one embodiment of the present disclosure.

FIG. 12 illustrates an example embodiment 470 of a 12-to-1 cascaded doubler series-parallel converter operating with four phases. The figure is similar to FIG. 1, but is configured with a doubler stage 472, a second doubler stage 474 and series-parallel stage 476 comprising two cells (one series and one parallel) connected to the resonant inductor stage 478 coupled to the load.

Figure 13:
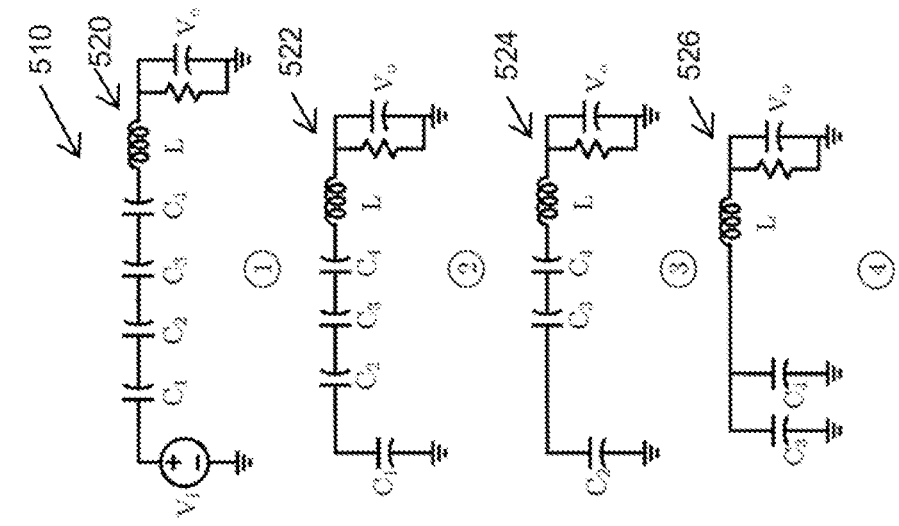
FIG. 13 is waveform diagrams of the 12-to-1 cascaded doubler series-parallel converter of FIG. 12, according to at least one embodiment of the present disclosure.
Figure 13:
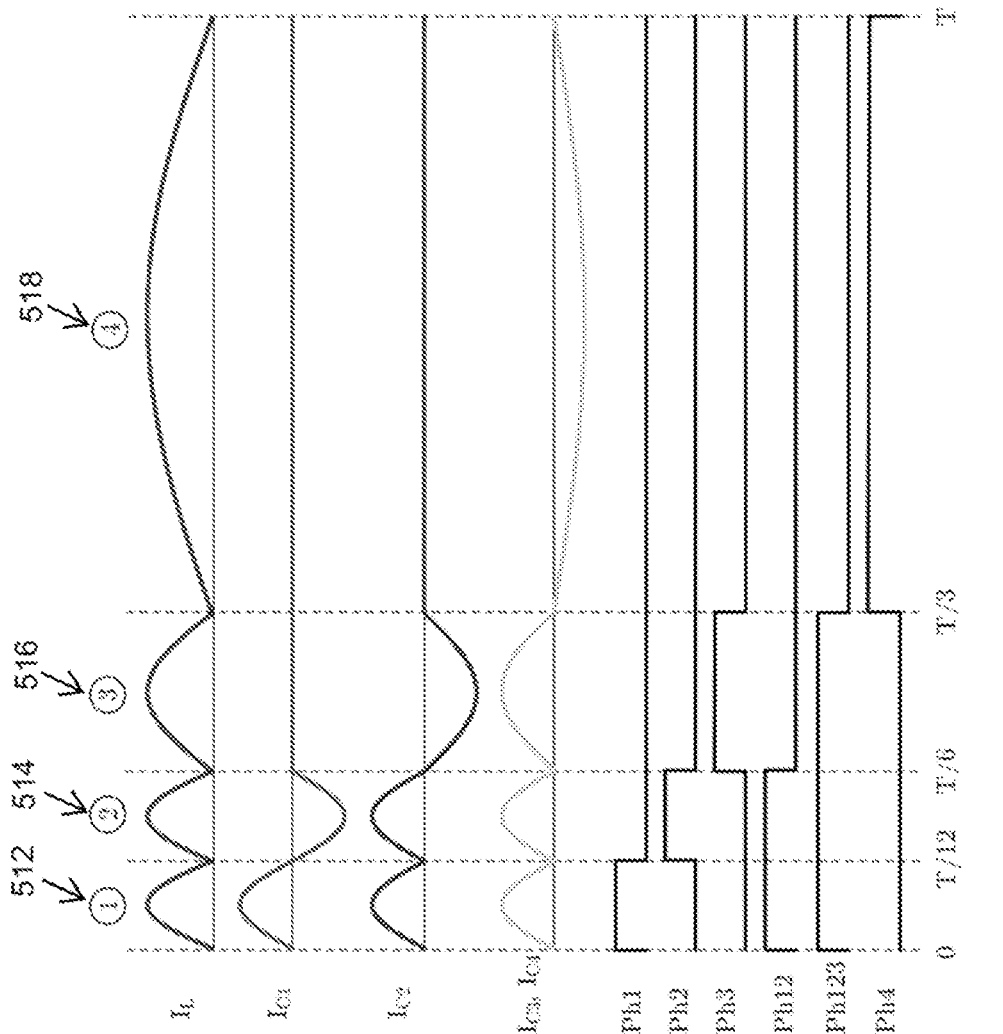

FIG. 13 illustrates an example embodiment 510 of the waveforms and equivalent circuits for the converter of FIG. 12. In the figure the four phases 512, 514, 516 and 518 are shown at the left with the waveforms, while the equivalent circuits 520, 522, 524 and 526 are shown on the right.

Figure 14:
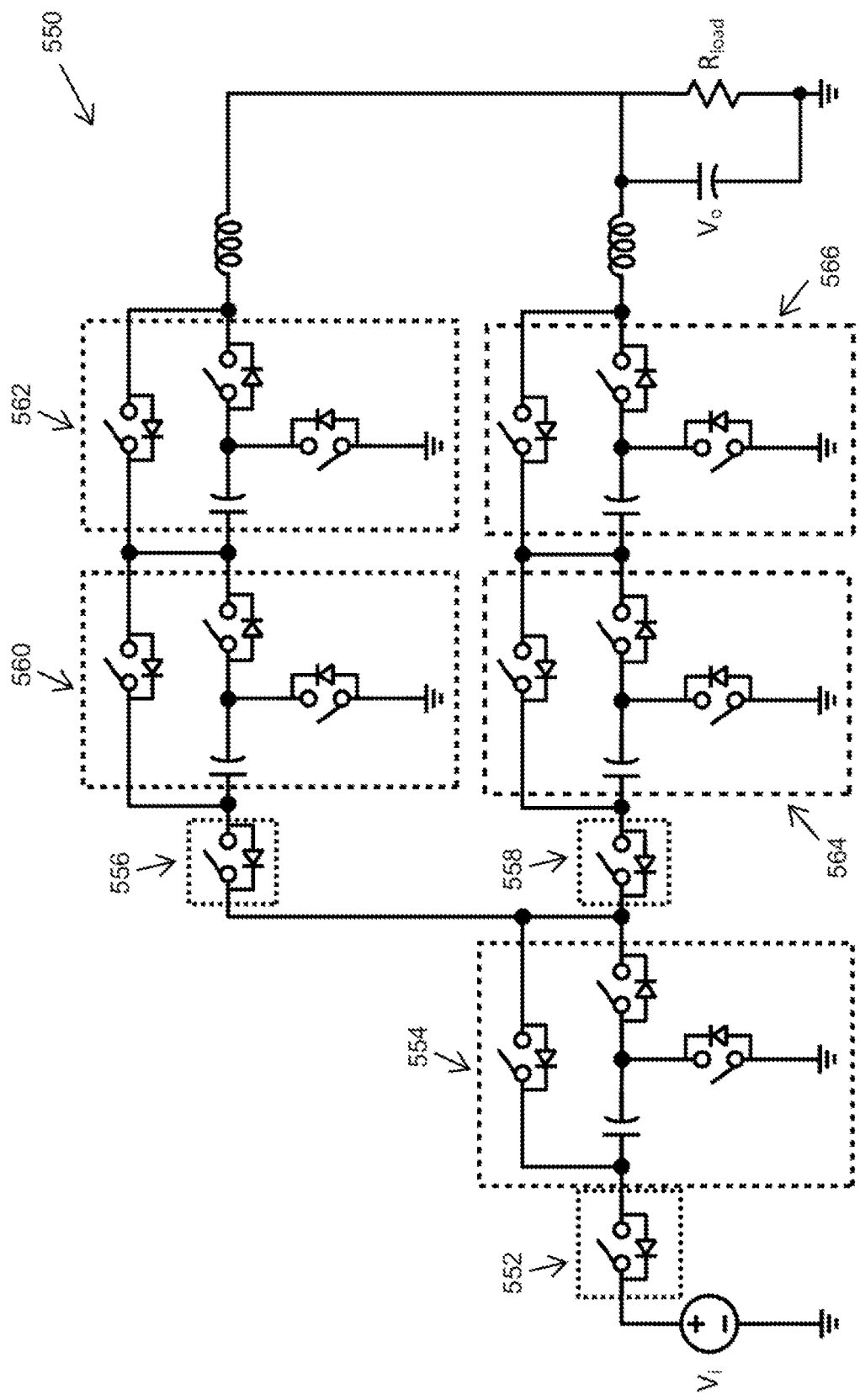
FIG. 14 is a schematic of an 8-to-1 multi-resonant-doubler ReSC converter with two parallel current paths to increase output power according to at least one embodiment of the present disclosure.

FIG. 14 illustrates an example embodiment 550 of an 8-to-1 multi-resonant-doubler ReSC converter with two parallel current paths for higher output power. The figure is similar to FIG. 1, but is configured with two parallel branches after first doubler stage 554. The first branch in the second SC stage consists of switch cells 560 and 562 (the switch cell is depicted in FIG. 7). They can be viewed as two doublers connected in series with a 4-to-1 conversion ratio. The second branch consists of switch cells 564 and 566. Switches 556 and 558 are used to selectively connect the desired second SC stage to the first SC stage 554. Similarly, series switch 552 is used to control the connection of the first SC stage with the input power source. More branches can be paralleled if higher power levels are desired, with switch cells such as 560 and 562 as basic building blocks. To interface with the preceding SC stage, each branch has a switch such as 556 or 558 at its input.

4. Conclusion

In this disclosure, the concept of multiple-operating-phases was applied to resonant SC converters. In comparison with two-phase operation, multi-phase operation can achieve the same conversion ratio with significantly fewer capacitors and switches, leading to potentially improved efficiency and power density performance. Specific examples were described for two multi-resonant SC topologies; the 8-to-1 multi-resonant-doubler converter and the 6-to-1 cascaded series-parallel converter.

Compared with the best in-class LLC converters, the MRD and CaSP converters in this present disclosure can achieve similar peak efficiency performance with higher power density at lower power rating. This property simplifies placing the bus converter close to the actual load to minimize the power distribution losses, while maintaining the flexibility to scale it up for higher power operations. The overall performance of these multi-resonant SC converters can become even more compelling as conduction losses at heavy loads are further ameliorated, thereby attaining a flatter efficiency curve across the entire load range.

The excellent performance of the disclosed converter family is demonstrated by theoretical comparisons and experimental results, which show promise for using these multi-resonant SC converters in high step-down (or step-up) applications such as the two-stage power delivery from the 48 V bus in data centers.

5. General Scope of the Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

A multi-resonant switched-capacitor converter apparatus, comprising: (a) a series switch having an input for connection to a voltage input, wherein said series switch is for controlling the connection to the voltage input; (b) a first switched-capacitor (SC) stage configured for a 2:1 conversion ratio which is coupled to an output of said series switch; (c) one or more cascaded intermediate SC stages, each having an arbitrary conversion ratio; (d) wherein a first intermediate SC stage, of said cascaded intermediate SC stages, is coupled to an output of said first SC stage while any subsequent intermediate SC stages are coupled in a cascading manner to an output of a previous intermediate SC stage; (e) wherein said first switched-capacitor (SC) stage and said one or more cascaded intermediate SC stages each comprise one or more switching cells comprising one capacitor and three switches; (f) a resonant inductor coupled from the output of the last of said cascaded intermediate SC stages to an output load being driven at a different voltage than said voltage input; (g) wherein said switching of said switching cells is performed in receipt of multi-phase control signals having at least three phase states within each period of multi-phase control signals; and (h) wherein said one or more switching cells are configured so that switching cells closer to the input side of said multi-resonant switched-capacitor converter apparatus are activated with shorter phase states than switching cells closer to the output of said multi-resonant SC converter apparatus.

A multi-resonant switched-capacitor converter apparatus, comprising: (a) a series switch having a first connection to a first port, wherein said series switch is for controlling the connection to the first port; (b) a first switched-capacitor (SC) stage configured for a 2:1 conversion ratio which is coupled to a second connection of said series switch; (c) one or more cascaded intermediate SC stages, each having an arbitrary conversion ratio; (d) wherein a first intermediate SC stage, of said cascaded intermediate SC stages, is coupled to an second connection of said first SC stage while any subsequent intermediate SC stages are coupled in a cascading manner to previous intermediate SC stages; (e) wherein said first switched-capacitor (SC) stage and said one or more cascaded intermediate SC stages each comprise one or more switching cells comprising one capacitor and three switches; (f) a resonant inductor coupled from the output of the last of said cascaded intermediate SC stages to a second port being driven at a different voltage than said first port; (g) wherein said switching of said switching cells is performed in receipt of multi-phase control signals having at least three phase states within each period of multi-phase control signals; (h) wherein said one or more switching cells are configured so that switching cells closer to the first port of said multi-resonant SC converter apparatus are activated with shorter phase states than switching cells closer to the second port of said multi-resonant SC converter apparatus; and (i) wherein said multi-resonant switched-capacitor converter operates in a step-down mode when an input voltage is coupled to said first port with the load connected to said second port; and (j) wherein said multi-resonant switched-capacitor converter operates in a step-up mode when an input voltage is coupled to said second port with the load connect to said first port.

A method for performing multi-resonant switched-capacitor power conversion, comprising: (a) cascading a first switched-capacitor (SC) stage configured for a 2:1 conversion ratio from a voltage input to one or more cascaded intermediate SC stages, each having an arbitrary conversion ratio, through a resonant inductor to a load; (b) wherein said first switched-capacitor (SC) stage and said one or more cascaded intermediate SC stages each comprise one or more switching cells comprising one capacitor and three switches; (c) coupling a resonant inductor between an output from the last of said cascaded intermediate SC stages to an output load being driven at a different voltage than said voltage input; (d) switching of said switching cells is performed in response to receipt of multi-phase control signals having at least three phase states within each period of multi-phase control signals; and (e) arranging said one or more switching cells so that switching cells closer to the input side of said multi-resonant switched-capacitor converter apparatus are activated with shorter phase states than switching cells closer to the output of said converter apparatus.

A multi-resonant switched-capacitor converter, comprising: an input; a front-end stage coupled to the input, wherein the front-end stage comprises a plurality of voltage doublers arranged in a cascading manner; an output; and a switch node coupled between the front-end stage and the output and comprising a resonant inductor.

A multi-resonant switched-capacitor converter, comprising: an input; an output; a front-end stage coupled to the input and comprising a first voltage doubler; a series-parallel stage coupled directly to the front-end stage; and a switch node coupled between the series-parallel stage and the output and comprising a resonant inductor.

A method, comprising: operating a multi-resonant switched-capacitor converter in a series mode to achieve a 2-to-1 voltage step-down during a first 1/N of a switching period; and operating the multi-resonant switched-capacitor converter in a parallel mode to achieve an N-to-1 voltage step-down during a last (N-1)/N of the switching period, wherein the multi-resonant switched-capacitor converter comprises: an input; a front-end stage coupled to the input and comprising a voltage doubler; a N:1 series-parallel stage coupled to the front-end stage; a switch node coupled to the N:1 series-parallel stage and comprising a resonant inductor; and an output coupled to the switch node.

The apparatus or method of any preceding implementation, wherein during receipt of multi-phase control signals within each period of multi-phase control signals, said resonant inductor will resonate at multiple different resonant frequencies, as operates with and is resonating with different capacitor(s) of the switching cells.

The apparatus or method of any preceding implementation, wherein said resonant operation is configured to provide soft-charging and soft-switching operations, toward enabling higher efficiency and power density than pure SC converters.

The apparatus or method of any preceding implementation, wherein capacitors and switches in the switching cells have an increasing phase time hierarchy configuration in which stages closer to the input of said multi-resonant switched-capacitor converter apparatus are configured for operating at higher voltages than those in the stages closer to the output of said multi-resonant SC converter apparatus.

The apparatus or method of any preceding implementation, wherein said increasing phase time hierarchical configuration of allows multiple instances of said multi-resonant SC converter to be paralleled together, in optimizing utilization of flying capacitors and associated switches.

The apparatus or method of any preceding implementation, wherein said multi-resonant switched-capacitor converter apparatus does not require interstage decoupling capacitors or interleaving operations toward reducing component count and control complexity.

The apparatus or method of any preceding implementation, wherein said first switched-capacitor (SC) stage and said one or more cascaded intermediate SC stages comprise three voltage doublers.

The apparatus or method of any preceding implementation, wherein said multi-resonant switched-capacitor converter is a four-phase, 8-to-1 multi-resonant switched-capacitor converter.

The apparatus or method of any preceding implementation, wherein said one or more cascaded intermediate SC stages comprises at least one series-parallel mode stage; and wherein said at least one series-parallel mode stage is operated in a series mode to achieve a 2-to-1 voltage step-down during a first 1/N of a switching period; and operated in a parallel mode to achieve an N-to-1 voltage step-down during a last (N-1)/N of the switching period.

The apparatus or method of any preceding implementation, wherein said at least one series-parallel mode stage comprises a 3-to-1 series-parallel mode stage, whereby said multi-resonant switched-capacitor converter is a three-phase, 6-to-1 multi-resonant switched-capacitor converter.

The apparatus or method of any preceding implementation, wherein said at least one series-parallel mode stage comprises a 4-to-1 series-parallel mode stage, whereby said multi-resonant switched-capacitor converter is a three-phase, 8-to-1 multi-resonant switched-capacitor converter.

The apparatus or method of any preceding implementation, wherein said at least one series-parallel mode stage comprises a 5-to-1 series-parallel stage, whereby said multi-resonant switched-capacitor converter is a three-phase, 10-to-1 multi-resonant switched-capacitor converter.

The apparatus or method of any preceding implementation, wherein said one or more cascaded intermediate SC stages comprises a doubler stage and said at least one series-parallel mode stage; and wherein said at least one series-parallel mode stage comprises a 3-to-1 series-parallel stage, whereby said multi-resonant switched-capacitor converter is a four-phase, 12-to-1 multi-resonant switched-capacitor converter.

The apparatus or method of any preceding implementation, wherein at least one additional current path is added into said one or more cascaded intermediate SC stages to support higher output power.

The apparatus or method of any preceding implementation, wherein at least one of the intermediate SC stages, within said one or more cascaded intermediate SC stages, operates as a series-parallel stage for operating in a series mode to achieve a 2-to-1 voltage step-down during a first 1/N of the switching period; and operating in a parallel mode to achieve an N-to-1 voltage step-down during a last (N-1)/N of the switching period.

The apparatus or method of any preceding implementation, wherein the plurality of voltage doublers comprises three voltage doublers.

The apparatus or method of any preceding implementation, wherein the multi-resonant switched-capacitor converter is a four-phase, 8-to-multi-resonant switched-capacitor converter.

The apparatus or method of any preceding implementation, wherein the plurality of voltage doublers comprises two voltage doublers.

The apparatus or method of any preceding implementation, further comprising a series-parallel stage coupled between the front-end stage and the resonant switch node.

The apparatus or method of any preceding implementation, wherein the multi-resonant switched-capacitor converter is a four-phase, 12-to-1 multi-resonant switched-capacitor converter.

The apparatus or method of any preceding implementation, wherein the front-end stage comprises only the first voltage doubler.

The apparatus or method of any preceding implementation, wherein the series-parallel stage comprises a 3:1 series-parallel stage.

The apparatus or method of any preceding implementation, wherein the multi-resonant switched-capacitor converter is a three-phase, 6-to-1 multi-resonant switched-capacitor converter.

The apparatus or method of any preceding implementation, wherein the series-parallel stage comprises a 4:1 series-parallel stage.

The apparatus or method of any preceding implementation, wherein the multi-resonant switched-capacitor converter is a three-phase, 8-to-1 multi-resonant switched-capacitor converter.

The apparatus or method of any preceding implementation, wherein the series-parallel stage comprises a 5:1 series-parallel stage.

The apparatus or method of any preceding implementation, wherein the multi-resonant switched-capacitor converter is a three-phase, 10-to-1 multi-resonant switched-capacitor converter.

As used herein, the term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these groups of elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system, or method.

As used herein, the term "set" refers to a collection of one or more objects. Thus, for example, a set of objects can include a single object or multiple objects.

Relational terms such as first and second, top and bottom, upper and lower, left and right, and the like, may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, apparatus, or system, that comprises, has, includes, or contains a list of elements does not include only those elements but may include other elements not expressly listed or inherent to such process, method, article, apparatus, or system. An element proceeded by "comprises . . . a", "has . . . a", "includes . . . a", "contains . . . a" does not, without more constraints, preclude the existence of additional identical elements in the process, method, article, apparatus, or system, that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential feature or element of the technology described herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after the application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure, but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Comparison of Number of Components for 8-to-1 SC Converters

| Topology | Number of Switches | Number of Capacitors |
|---|---|---|
| Multi-Resonant-Doubler | 10 ($4V_o$ x4, $2V_o$ x3, $V_o$ x3) | 3 ($4V_o$, $2V_o$, $V_o$) |
| Cascaded Resonant | 12 ($4V_o$ x4, $2V_o$ x4, $V_o$ x4) | 3 ($4V_o$, $2V_o$, $V_o$) |

TABLE 1-continued

Comparison of Number of Components for 8-to-1 SC Converters

| Topology | Number of Switches | Number of Capacitors |
|---|---|---|
| Fibonacci | 13 | 4 |
| | ($5V_o$ x2, $3V_o$ x4, $2V_o$ x3, $2V_o$ x4) | ($5V_o$, $3V_o$, $2V_o$, $V_o$) |
| Series-Parallel | 22 | 7 |
| | ($7V_o$ x3, $6$-$2V_o$ x2, $V_o$ x9) | ($V_o$ x7) |
| Dickson (Switched-Tank) | 22 | 7 |
| | ($2V_o$ x6, $V_o$ x16) | ($7V_o$, $6V_o$, ... $V_o$) |

TABLE 2

Comparison of Passive and Active Component Utilization for 8-to-1 SC Converter

| Topology | Passive Volume | $VA_{rms}$ Rating | $R_{out}$ (assume = R for all switches) |
|---|---|---|---|
| Multi-Resonant-Doubler | 1.7 | 11.7 | 2.75 (10 switches) |
| | | | 2 (13 switches) |
| | | | 1.25 (22 switches) |
| Cascaded Resonant | 1.7 | 8.5 | 2.625 (12 switches) |
| | | | 1.625 (16 switches) |
| | | | 1.125 (24 switches) |
| Fibonacci | 2.2 | 8.9 | 2.165 (13 switches) |
| | | | 1.4775 (16 switches) |
| Series-Parallel | 1 | 12.4 | 1.25 (22 switches) |
| Dickson (Switched-Tank) | 4.4 | 5 | 0.8 (22 switches) |

TABLE 3

Select Prototype Parameters of MRD Converter

| Characteristic | Nominal | Range |
|---|---|---|
| Input Voltage | 48 V | 40 to 60 V |
| Output Voltage | 6 V | 5 to 7.5 V |
| Output Current | 40 A | 40 A |
| Power Rating | 240 W | 200 to 300 W |
| Switching Frequency | 70 KHz | 70-78 kHz |

What is claimed is:

1. A multi-resonant switched-capacitor converter apparatus, comprising:
   a series switch having an input for connection to a voltage input, wherein said series switch is for controlling the connection to the voltage input;
   a first switched-capacitor (SC) stage configured for a 2:1 conversion ratio which is coupled to an output of said series switch;
   one or more cascaded intermediate SC stages, each having an arbitrary conversion ratio;
   wherein a first intermediate SC stage, of said cascaded intermediate SC stages, is coupled to an output of said first SC stage while any subsequent intermediate SC stages are coupled in a cascading manner to an output of a previous intermediate SC stage;
   wherein said first switched-capacitor (SC) stage and said one or more cascaded intermediate SC stages each comprise one or more switching cells comprising one capacitor and three switches;
   a resonant inductor coupled from the output of the last of said cascaded intermediate SC stages to an output load being driven at a different voltage than said voltage input;
   wherein said switching of said switching cells is performed in receipt of multi-phase control signals having at least three phase states within each period of multi-phase control signals; and
   wherein said one or more switching cells are configured so that switching cells closer to the input side of said multi-resonant switched-capacitor converter apparatus are activated with shorter phase states than switching cells closer to the output of said multi-resonant SC converter apparatus.

2. The apparatus of claim 1, wherein during receipt of multi-phase control signals within each period of multi-phase control signals, said resonant inductor will resonate at multiple different resonant frequencies, as operates with and is resonating with different capacitor(s) of the switching cells.

3. The apparatus of claim 2, wherein said resonant operation is configured to provide soft-charging and soft-switching operations, toward enabling higher efficiency and power density than pure SC converters.

4. The apparatus of claim 1, wherein capacitors and switches in the switching cells have an increasing phase time hierarchy configuration in which stages closer to the input of said multi-resonant switched-capacitor converter apparatus are configured for operating at higher voltages than those in the stages closer to the output of said multi-resonant SC converter apparatus.

5. The apparatus of claim 1, wherein said increasing phase time hierarchical configuration allows multiple instances of said multi-resonant SC converter to be paralleled together, in optimizing utilization of flying capacitors and associated switches.

6. The apparatus of claim 1, wherein said multi-resonant switched-capacitor converter apparatus does not require interstage decoupling capacitors or interleaving operations toward reducing component count and control complexity.

7. The apparatus of claim 1, wherein said first switched-capacitor (SC) stage and said one or more cascaded intermediate SC stages comprise three voltage doublers.

8. The apparatus of claim 7, wherein said multi-resonant switched-capacitor converter is a four-phase, 8-to-1 multi-resonant switched-capacitor converter.

9. The apparatus of claim 1:
   wherein said one or more cascaded intermediate SC stages comprises at least one series-parallel mode stage; and
   wherein said at least one series-parallel mode stage is operated in a series mode to achieve a 2-to-1 voltage step-down during a first 1/N of a switching period, and is operated in a parallel mode to achieve an N-to-1 voltage step-down during a last (N-1)/N of the switching period.

10. The apparatus of claim 9, wherein said at least one series-parallel mode stage comprises a 3-to-1 series-parallel mode stage, whereby said multi-resonant switched-capacitor converter is a three-phase, 6-to-1 multi-resonant switched-capacitor converter.

11. The apparatus of claim 9, wherein said at least one series-parallel mode stage comprises a 4-to-1 series-parallel mode stage, whereby said multi-resonant switched-capacitor converter is a three-phase, 8-to-1 multi-resonant switched-capacitor converter.

12. The apparatus of claim 9, wherein said at least one series-parallel mode stage comprises a 5-to-1 series-parallel stage, whereby said multi-resonant switched-capacitor converter is a three-phase, 10-to-1 multi-resonant switched-capacitor converter.

13. The apparatus of claim 9:
wherein said one or more cascaded intermediate SC stages comprises a doubler stage and said at least one series-parallel mode stage; and
wherein said at least one series-parallel mode stage comprises a 3-to-1 series-parallel stage, whereby said multi-resonant switched-capacitor converter is a four-phase, 12-to-1 multi-resonant switched-capacitor converter.

14. The apparatus of claim 1, wherein at least one additional current path is added into said one or more cascaded intermediate SC stages to support higher output power.

15. A multi-resonant switched-capacitor converter apparatus, comprising:
a series switch having a first connection to a first port, wherein said series switch is for controlling the connection to the first port;
a first switched-capacitor (SC) stage configured for a 2:1 conversion ratio which is coupled to a second connection of said series switch;
one or more cascaded intermediate SC stages, each having an arbitrary conversion ratio;
wherein a first intermediate SC stage, of said cascaded intermediate SC stages, is coupled to an second connection of said first SC stage while any subsequent intermediate SC stages are coupled in a cascading manner to previous intermediate SC stages;
wherein said first switched-capacitor (SC) stage and said one or more cascaded intermediate SC stages each comprise one or more switching cells comprising one capacitor and three switches;
a resonant inductor coupled from the output of the last of said cascaded intermediate SC stages to a second port being driven at a different voltage than said first port;
wherein said switching of said switching cells is performed in receipt of multi-phase control signals having at least three phase states within each period of multi-phase control signals;
wherein said one or more switching cells are configured so that switching cells closer to the first port of said multi-resonant SC converter apparatus are activated with shorter phase states than switching cells closer to the second port of said multi-resonant SC converter apparatus; and
wherein said multi-resonant switched-capacitor converter operates in a step-down mode when an input voltage is coupled to said first port with the load connected to said second port; and
wherein said multi-resonant switched-capacitor converter operates in a step-up mode when an input voltage is coupled to said second port with the load connect to said first port.

16. A method for performing multi-resonant switched-capacitor power conversion, comprising:
cascading a first switched-capacitor (SC) stage configured for a 2:1 conversion ratio from a voltage input to one or more cascaded intermediate SC stages, each having an arbitrary conversion ratio, through a resonant inductor to a load;
wherein said first switched-capacitor (SC) stage and said one or more cascaded intermediate SC stages each comprise one or more switching cells comprising one capacitor and three switches;
coupling a resonant inductor between an output from the last of said cascaded intermediate SC stages to an output load being driven at a different voltage than said voltage input;
switching of said switching cells is performed in response to receipt of multi-phase control signals having at least three phase states within each period of multi-phase control signals; and
arranging said one or more switching cells so that switching cells closer to the input side of said multi-resonant switched-capacitor converter apparatus are activated with shorter phase states than switching cells closer to the output of said converter apparatus.

17. The method as recited in claim 16, wherein at least one of the intermediate SC stages, within said one or more cascaded intermediate SC stages, operates as a series-parallel stage for operating in a series mode to achieve a 2-to-1 voltage step-down during a first 1/N of the switching period; and operating in a parallel mode to achieve an N-to-1 voltage step-down during a last (N-1)/N of the switching period.

* * * * *